United States Patent
Takeda et al.

(10) Patent No.: US 7,805,605 B2
(45) Date of Patent: Sep. 28, 2010

(54) SERVER, TERMINAL CONTROL DEVICE AND TERMINAL AUTHENTICATION METHOD

(75) Inventors: Yukiko Takeda, Tokorozawa (JP); Hidenori Inouchi, Higashimurayama (JP); Shinsuke Suzuki, Tama (JP); Keisuke Takeuchi, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 1371 days.

(21) Appl. No.: 10/782,837

(22) Filed: Feb. 23, 2004

(65) Prior Publication Data

US 2004/0205211 A1    Oct. 14, 2004

(30) Foreign Application Priority Data

Mar. 11, 2003    (JP)    ............................. 2003-064329

(51) Int. Cl.
*H04L 29/06*    (2006.01)
(52) U.S. Cl. .................................................. 713/156
(58) Field of Classification Search ................. 713/156; 709/230
See application file for complete search history.

(56) References Cited

U.S. PATENT DOCUMENTS

| 5,517,618 | A | * | 5/1996 | Wada et al. | ................. | 709/223 |
| 6,018,524 | A | * | 1/2000 | Turner et al. | ................. | 370/392 |
| 6,769,000 | B1 | * | 7/2004 | Akhtar et al. | ........... | 707/103 R |
| 2002/0046349 | A1 | * | 4/2002 | Saito | ........................... | 713/201 |
| 2002/0133607 | A1 | * | 9/2002 | Nikander | ..................... | 709/229 |
| 2005/0041634 | A1 | * | 2/2005 | Aura | .......................... | 370/351 |

OTHER PUBLICATIONS

Hesham Soliman, Claude Castelluccia, Karim El-Malki, Ludovic Bellier, "Hierarchical MIPv6 Mobility Management", Feb. 2001, IETF Mobile IP Working Group, pp. 1-5.*
Johnson, Perkins, Arkko, "Mobility Support in IPv6", Internet Draft, Oct. 29, 2002, <draft-ietf-mobileip-ipv6-19.txt>, 2 pages.
"Introduction", <draft-ietf-mobileip-mipv6-ha-ipsec-01.txt>, 1 page, Date: Oct. 2002.
"Public Keys and Public-Key Certificates", X.509, 4 pages, Date Feb. 2004.
PKI Management Overview:, IETF RFC2510, Mar. 1999, 3 pages.
"Overview of HMIPv6", Internet Draft, Oct. 2002, <draft-ietf-mobileip-hmipv6-07.txt>, 1 page.
"IPv6 Prefix Options for DHCPv6", Internet Draft, Nov. 2002, <draft-ietf-dhc-dhcpv6-opt-prefix-delegation-01.txt>, 1 page.

* cited by examiner

*Primary Examiner*—Benjamin E Lanier
*Assistant Examiner*—Cordelia Zecher
(74) *Attorney, Agent, or Firm*—Stites & Harbison, PLLC; Juan Carlos A. Marquez, Esq

(57) ABSTRACT

Information on whether a prefix is distributable to a MN is held by a CA. The server section of the HA allots prefix information to a MN approved by the CA. When the server section of the HA receives an IKE packet from the MN, the server section generates an IPsec SA after checking the prefix information in the server section. The server section allows an MN location registration request to fulfill the IPsec SA. The CA approves distribution of a prefix to the MN and verifies that the MN is genuine by generating an IPsec SA with the HA by utilizing the prefix distributed by the MN.

10 Claims, 29 Drawing Sheets

FIG. 3

BINDING CACHE MANAGEMENT TABLE 310

| HOME ADDRESS 311 | CARE OF ADDRESS 312 | LIFETIME 313 | |
|---|---|---|---|
| | | | 310-1 |
| | | | 310-2 |
| | | | 310-n |

FIG. 4

PREFIX CONTROL TABLE 320

| DHCP CLIENT IDENTIFIER | IAID | PREFIX | LIFETIME | |
|---|---|---|---|---|
| | | | | 320-1 |
| | | | | 320-2 |
| | | | | 320-n |

PREFIX ALLOCATION CONTROL TABLE (CA) 330

| ID | PREFIX ISSUE OK | |
|---|---|---|
| 331 | 332 | |
| | | 330-1 |
| | | 330-2 |
| | | 330-n |

S3 ISAKMP PACKET FORMAT

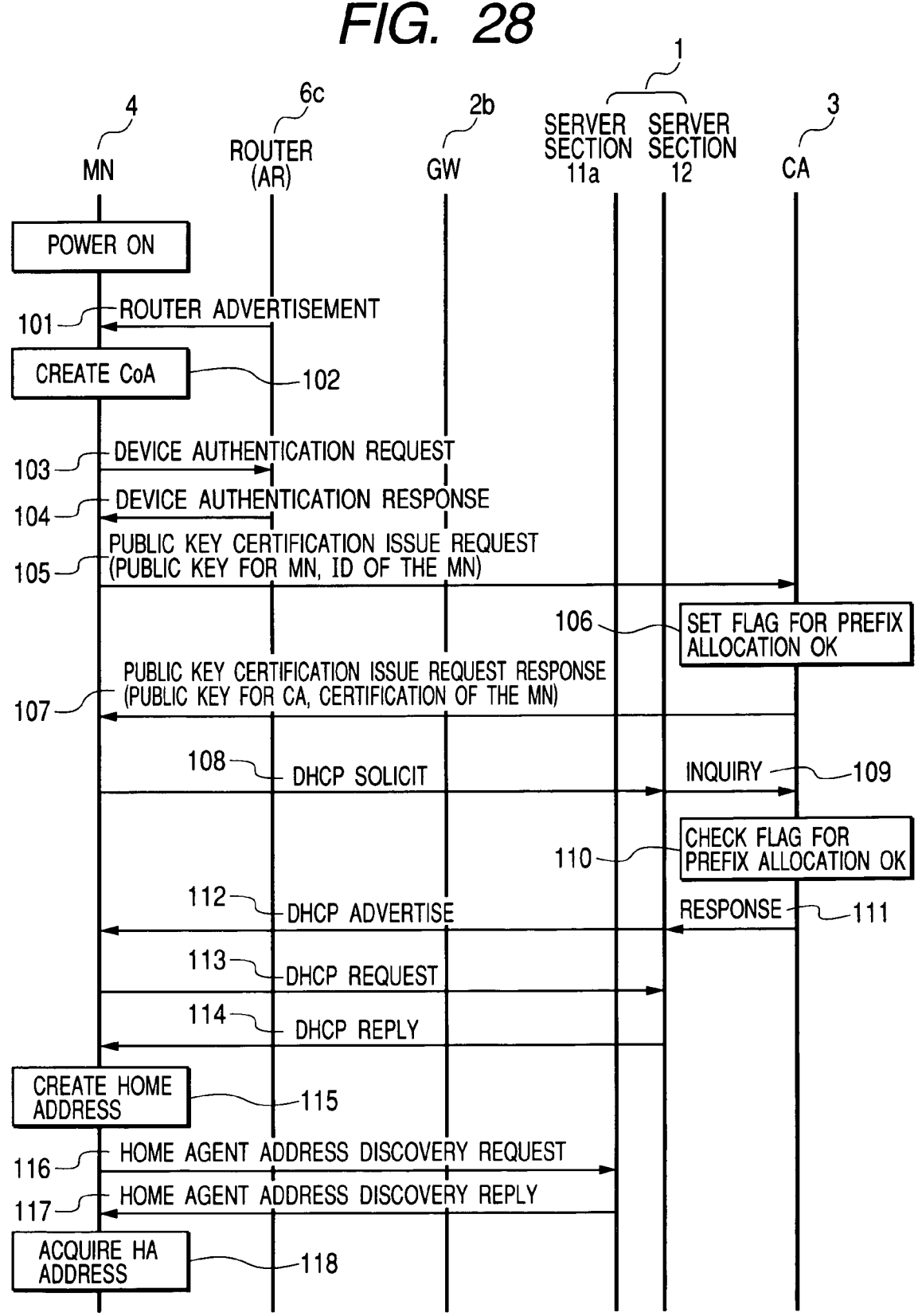

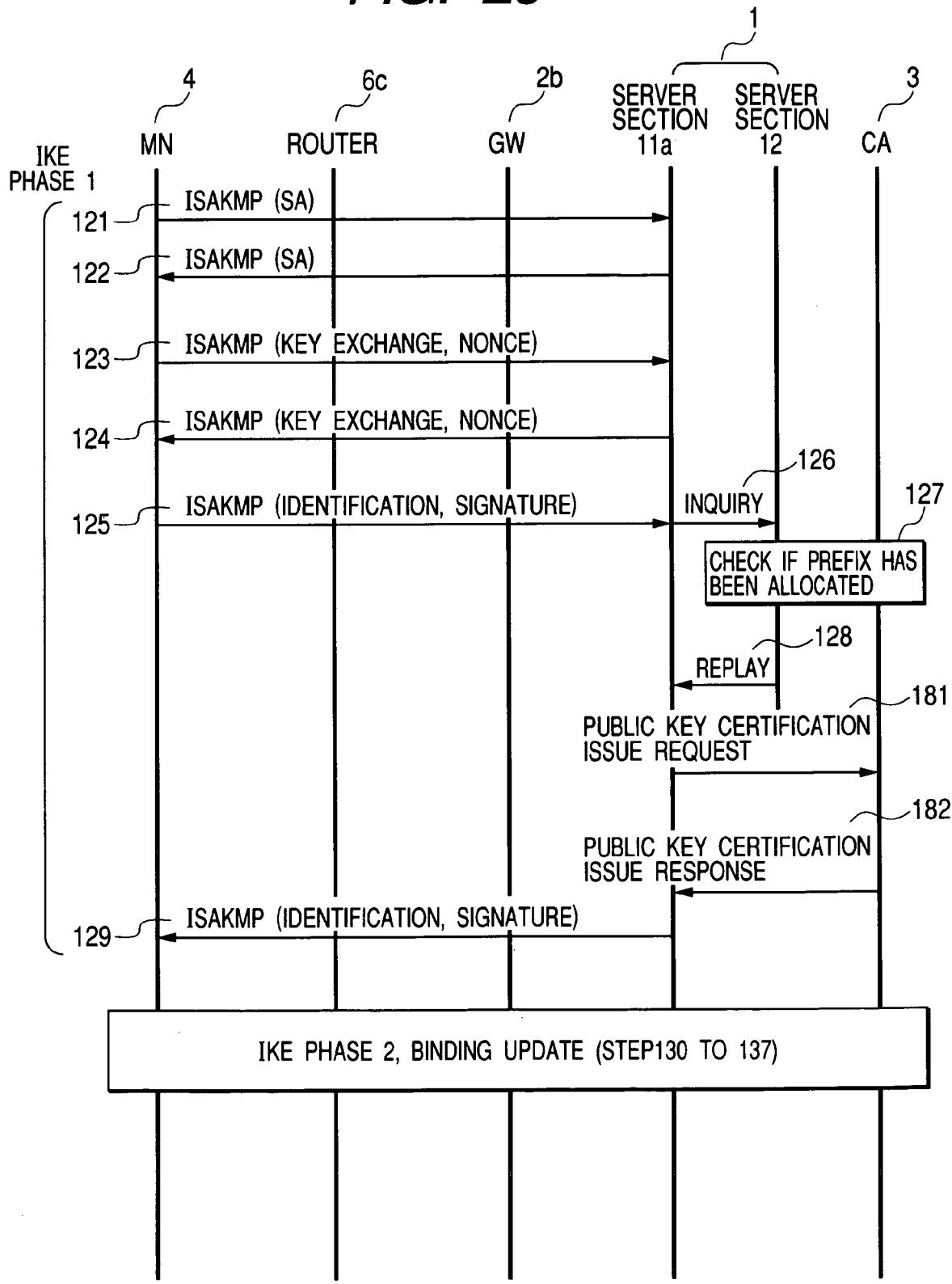

SERVER, TERMINAL CONTROL DEVICE AND TERMINAL AUTHENTICATION METHOD

PRIORITY CLAIM

This application claims priority under 35 USC 119 to Japanese patent application P2003-064329 filed Mar. 11, 2003, the entire disclosure of which is hereby incorporated by reference.

FIELD OF THE INVENTION

The present invention relates to a server, mobile control device, and terminal authentication method. The present invention relates in particular to a server, home agent device and terminal authentication method for guaranteeing and issuing public key certifications in communication systems using mobile IP protocol.

BACKGROUND OF THE INVENTION

The IETF (Internet Engineering Task Force) is evaluating specifications for Mobile IPv6 (Ref. Mobility Support in IPv6 <draft-ietf-mobileip-ipv6-19.txt>, Work in Progress).

The elements comprising the Mobile IPv6 network are a mobile node (MN), a home agent (HA), and correspondent node (CN).

The MN is assigned an IP address (home address) that does not change even if the MN moves. A link possessing a prefix identical to the home address is called a home link. The HA manages MN location information (binding cache) in locations other than the home link.

The MN acquires a Care of Address (hereafter CoA) for links other than the home link. The MN that is not within the home link receives router reports (advertisements) sent periodically by a router within the visited link. The MN senses movement by detecting a prefix different from the home address and generates a CoA. The MN registers (stores) information linking the CoA and home address within the HA.

The MN contains a home agent address discovery function (function for finding the HA address) and may actively search for the IP address of the HA. The MN first of all creates a Mobile IPv6 Home-Agents Anycast Address from the prefix of the home link. The MN sends an ICMP Home Agent Address Discovery Request to the address destination. This signal is received by one of the home link HA. The HA that received the signal sends an ICMP Home Agent Address Discovery Reply containing information on the HA to the MN. The MN extracts the HA information from this signal and acquires the HA address. The MN sends a binding update for that HA address.

The HA receives the binding update and stores the MN location information in the binding cache.

In order to function as a proxy for the MN, the HA sends a neighbor advertisement addressed to all-nodes multicast addresses of the home link. The node that received that neighbor advertisement, stores information linking the MN home address and HA link layer address, in the neighbor cache. The HA captures the packet addressed to the home address of the MN.

Mobile IPv6 contains a function to notify MN outside the home link, of home network prefix information. For example, if the prefix of the home network has been changed, the HA refers (searches) the binding cache and reports the prefix information (makes a mobile prefix advertisement) to the MN among the registered positions. The MN may also make a request to the HA for prefix information (mobile prefix solicitation).

The IP Security Protocol (IPsec) is the focus of attention as a technology for achieving security on the IP network. This IPsec is a technology for safely conveying IP packets by utilizing encryption technology and certification technology. Mobile IPv6 is applying this IPsec technology in the sending of location registration signals (binding updates) from the MN to the HA (Ref. draft-ietf-mobileip-mipv6-ha-ipsec-01.txt, Work in Progress).

This IPsec technology provides a security function by creating an SA (security association) among the devices using IPsec. The devices utilizing IPsec contain a SPD (security policy database) and an SAD (security association database).

The security policy database (SPD) specifies the method for processing the packets. The security association database (SAD) is a list of SA (security associations) held in the devices using IPsec. The SA is identified by a SPI (Security Parameters Index).

The method for creating the SA includes a manual setting method and an automatic creation method. The IKE (Internet Key Exchange) is a protocol for automatically creating and managing these SA. The IKE automatically generates the SA by making use of a proposal exchange function, a function to generate a secret key, and a certification function for IKE correspondent nodes.

Certification methods specified for IKE correspondent nodes are the Pre-shared key authentication method, public key certification method, digital signature authentication method, etc. The digital signature authentication method is highly flexible since it need not share key information beforehand with the other communication party (or correspondent node). The digital signature certification method is used by the CA (Certification Authority) for issuing public key certifications. The format for public key certification is the specified in X. 509.

The CMP (Certificate Management Protocol) is a protocol for issuing and managing electronic certifications. The CMP is specified in IETF RFC2510. The CMP is utilized in transport protocols in HTTP (HyperText Transfer Protocol) and TCP (Transmission Control Protocol).

One technology proposed for localized mobility management based on Mobile IPv6 is Hierarchial Mobile IPv6 mobility management (HMIPv6) (Ref. draft-ietf-mobileip-hmipv6-07.txt, Work in Progress). This HMIPv6 contains a MAP (Mobile Anchor Point) between the HA and MN. The MN receives a router advertisement containing MAP options from the AR (Access Router), acquires the MAP IP address, and generates a RCOA (Regional Care of Address) and LCoA (On-link CoA). The MN compatible with HMIPv6 registers location information in the MAP and HA. The MAP manages the binding information of the MN RCoA and LCoA. The HA manages the binding information of the MN home address and RCoA. The MN only rewrites (updates) the MAP location information when the MN has moved within the MAP.

The IETF is currently evaluating IPv6 Prefix Delegation Options for DHCPv6 (hereafter, DHCP-PD) (draft-ietf-dhc-dhcpv6-opt-prefix-delegation-01.txt, Work in Progress). The DHCP-PD is a function making use of DHCP (Dynamic Host Configuration Protocol) to assign IPv6 prefixes (group) to sites from the address assignment side.

The elements comprising the DHCP-PD are the delegating router and the requesting router. The requesting router asks the delegating router to assign an IPv6 prefix (group). The delegating router selects an IPv6 prefix (group) and sends that to the requesting router. The DHCP-PD for example, is utilized by the ISP (Internet Service Provider) when assigning prefixes to subscribers.

In a communication system mutually connected to both a zone A and zone B, when a mobile node (MN) belonging to zone A has moved to zone B, that MN registers its location in the HA of zone A. The location registration signal (binding update signal) is then subjected to IPsec processing.

The related art has the problem that security cannot be maintained when manually setting the SA (security association) for the HA and MN, and information about the key used in encryption has leaked out. Also, using the Mobile IPv6 prefix report (advertise) function and HA address discovery function will change the home address of the MN or HA address. The method for manually setting the SA between the MN and HA is therefore not practical during system operation. There is also no means for currently verifying on Mobile IP if the MN is genuine.

SUMMARY OF THE INVENTION

The present invention may provide a terminal authentication method that utilizes Mobile IP technology. In particular, this invention may provide a procedure for authenticating terminals by linking a digital signature authentication method with a Mobile IP location registration procedure, and by creating and holding a SA (security association) for a home address linked to the HA issuing public key certifications.

The present invention may also to provide a system for authenticating genuine terminals by linking a DHCP-PD delegating router and CA, and by linking a DHCP-PD delegating router and HA, when the MN is dynamically acquiring a home address.

The present invention in particular may have the following features when a terminal x of a home network with an HA belonging to zone A, utilizes a DHCP-PD section in zone B to acquire a home network prefix.
1) The DHCP-PD delegating router may allot prefix information to a terminal approved by CA.
2) The HA creates an SA for an IP address possessing a prefix allocated by that delegating router, and approves location registration to satisfy the SA.

The present invention may also to provide an authentication method for a DHCP delegating router to allot prefix information to terminals approved by the CA, when a communication device belonging to zone B possesses a HMIPv6 compatible MAP, and that communication device receives a binding update from the MN and starts the DHCP-PD section.

The present invention may also provide a communication method for the HA to report prefix information to a terminal approved by CA.

More specifically:
(1) The CA may be comprised of a system for communicating with a DHCP-PD delegating router section 16 as show in FIGS. 2, 20, and 23. The CA issues a public key certification to the terminal and allows reporting prefix information.
(2) The terminal is comprised of a Mobile IPv6 function, an IPsec function, and a function to hold information required for a digital signature name. Information required for authenticating a digital signature name may be received from an external storage device. The terminal need not be a mobile terminal.
(3) The terminal control device contains a delegating router function for a DHCPv6 Prefix delegation option (hereafter, DHCP-PD). The delegating router function is comprised of a system for communicating with CA, and a system for reporting prefix information to a terminal approved by CA.
(4) The terminal control device inquires about prefix information to the DHCP-PD delegating router function when a request to create an SA is received from the terminal. The terminal control device comprises a system to create an SA among terminals if the terminals utilize prefixes allotted by the delegating router function.
(5) The terminal control device may contain a storage device or system to hold the public key certification for a terminal. Prefix information may be conveyed to terminals approved by the CA.

DETAILED DESCRIPTION OF THE DRAWINGS

FIG. 3 is a binding cache management table contained in HA1:

FIG. 4 is a prefix control table contained in HA1;

FIG. 8 is a drawing of a prefix allocation control table contained in CA3;

FIG. 28 is an alternative sequence drawing 1 for location registration (binding update) and authentication in the first embodiment.

FIG. 29 is an alternative sequence drawing 2 for location registration (binding update) and authentication in the first embodiment.

DETAILED DESCRIPTION OF THE PREFERRED EMBODIMENTS

First Embodiment

The first embodiment of the present invention is described next while referring to the accompanying drawings. In this embodiment, the HA is equivalent to a terminal control device.

The MN authentication method and location registration method used when the Mobile IPv6 compatible mobile node (MN) is in a network (hereafter, visited network) other than the home link (hereafter, home network) is described in detail.

Figure 1:
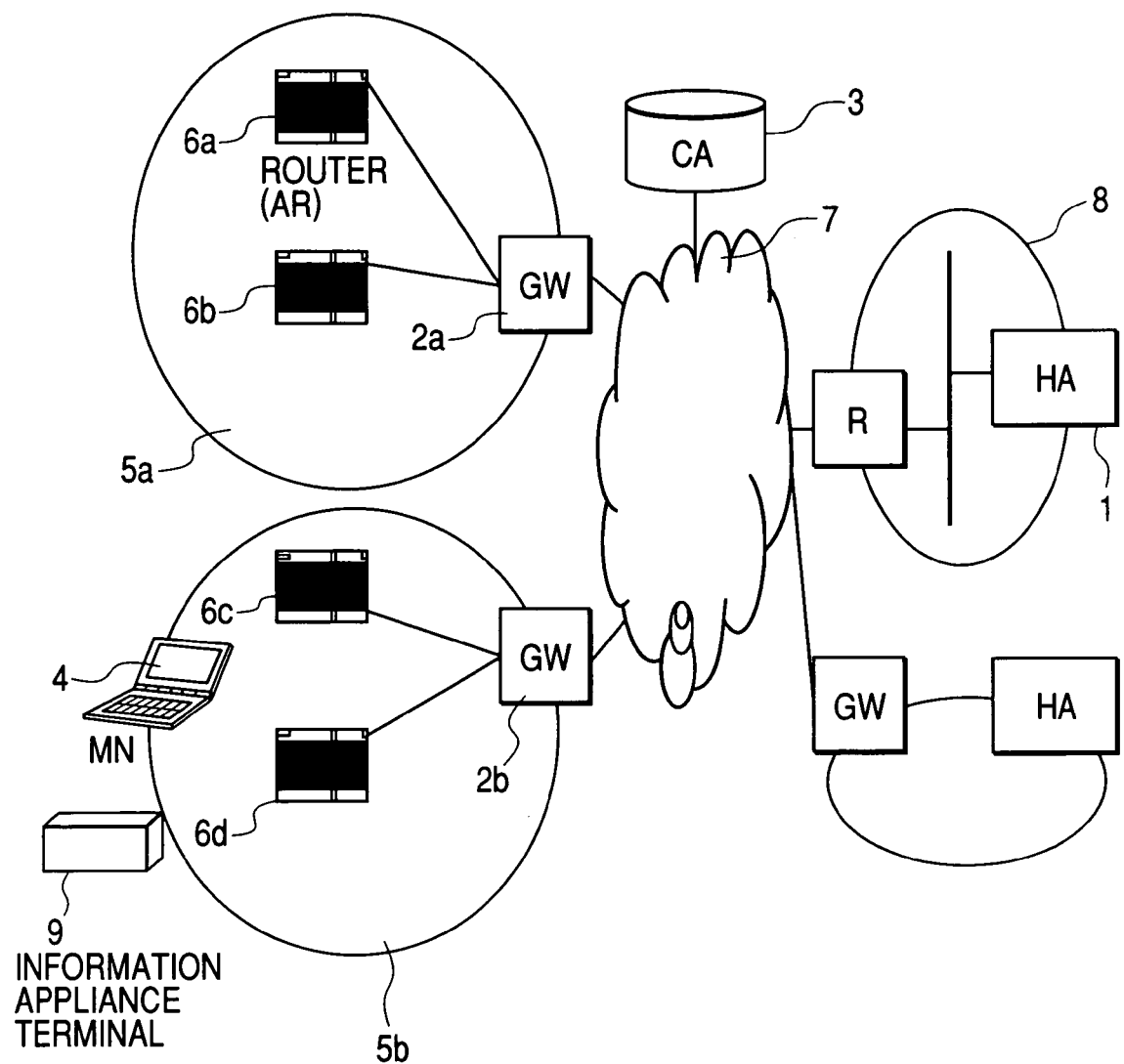
FIG. 1 is a concept drawing showing the structure of the communication network of the present invention.

FIG. 1 shows the structure of the communication network of the present invention. The communication network is comprised of a home network 8 for MN4, an IP network 7 and a visited network 5 (5a, 5b). In this embodiment, the home network 8, the IP network 7 and the visited network 5 are IPv6 networks. The MN4 is a mobile node (MN) compatible with Mobile IPv6. The information appliance terminal 9 contains MN functions compatible with Mobile IPv6. The visited network 5 and IP network 7, and the IP network 7 and home network 8 are connected by router or a gateway device. The visited network 5 and home network 8 may also be directly connected by a router or a gateway device.

The home network 8 contains a home agent HA1. The HA1 is a home agent (HA) compatible with Mobile IPv6. The HA1 manages MN location information other than in the home network 8.

The visited network 5 (5a, 5b) is comprised of a communication device 2 (2a, 2b) and a router 6 (6a, 6b, 6c, 6d). The communication device 2 is comprised of an interface with a router 6, and an interface with an IP network 7. The router 6 contains a device authentication function.

Instead of the device authentication function, the router 6 may utilize a system for communicating with a server possessing a device authentication function.

The IP network 7 contains the CA3. The home network 8 or the visited network 5 may also contain the CA3.

Figure 2:
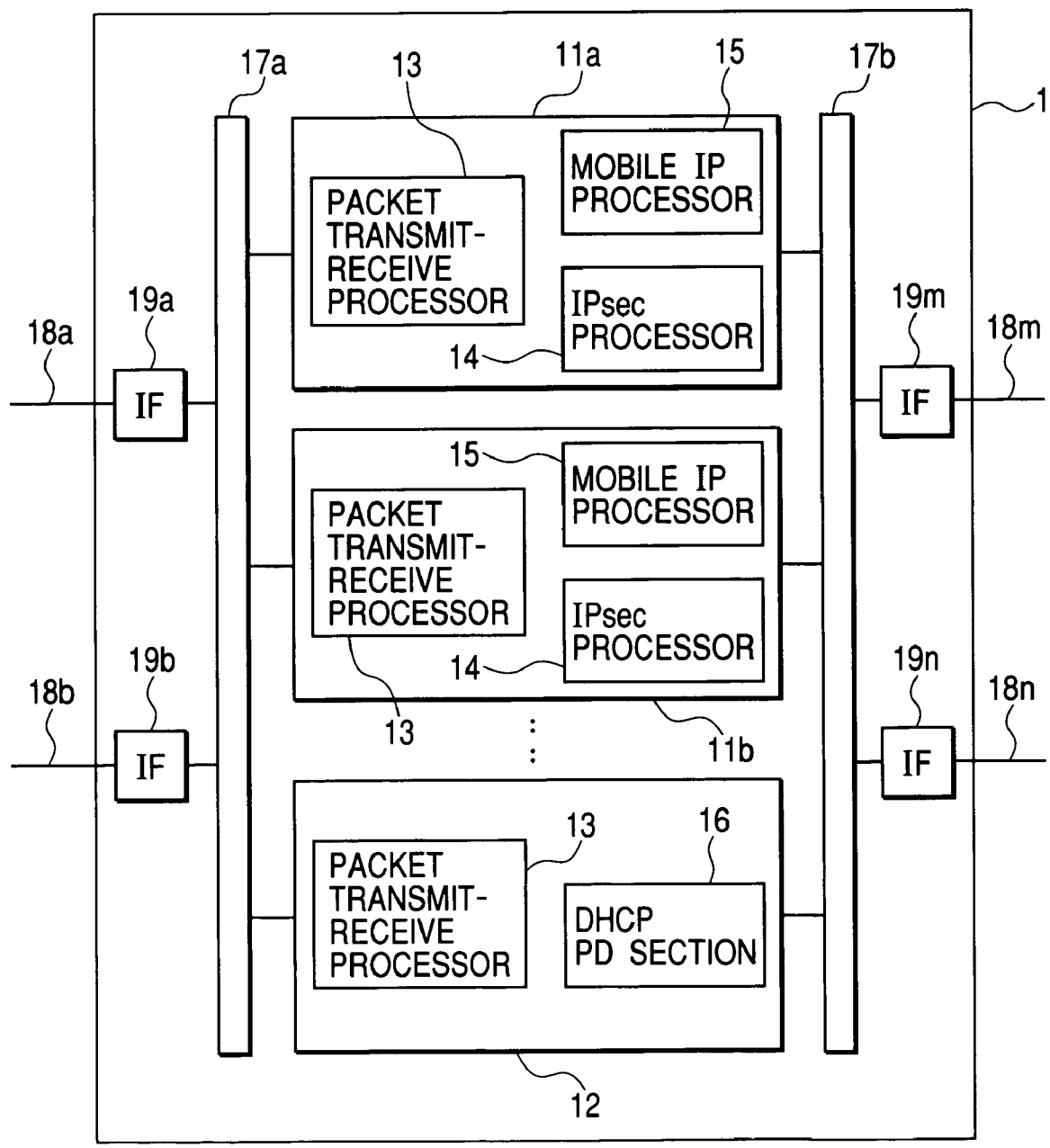
FIG. 2 is block diagram of the home agent HA1.

FIG. 2 shows the structure of the HA1 installed in the home network 8 of MN4. The HA1 is comprised of a server section 11, (11a, 11b), a server section 12, and an interface section (IF) 19 (19a, 19b, 19m, 19n) containing a line 18 (18a, 18b, 18m, 18n) and, a switch section 17 (17a, 17b).

The server section 11 mainly contains a packet transmit-receive processor 13, an IPsec processor 14, and a mobile IP processor 15. The packet transmit-receive processor 13 contains a function to transmit or receive data packets. The IPsec processor 14 contains mainly an SPD, SAD and an IPsec processing routine 70. The IPsec processor 14 authenticates packets and performs encoding. The IPsec processor 14 acquires server section 11 public key certification from the CA3. The mobile IP processor 15 contains a Mobile IPv6 for the home agent (HA) function. The mobile IP processor 15 contains a binding cache management table 310.

FIG. 3 shows the table structure of the binding cache management table 310. The binding cache management table 310 stores at least a Care of Address (CoA) 312 acquired by the MN in the visited network for the MN home address 311, and a Lifetime 313 showing the effective period of the binding cache.

The server section 12 contains a packet transmit-receive processor 13 and a DHCP PD section 16.

The DHCP PD section 16 contains a DHCP-PD delegating router function. It also contains mainly a prefix control table 320, a prefix delegation processing routine 60, and a table linking the IA_PD for identifying the DHCP-PD and an MN identifier.

FIG. 4 shows the structure of the prefix control table 320. This prefix control table 320 in DHCP PD Section 16 stores at least an IAID322 showing the prefix (group), an allocated prefix 323, and a lifetime 324 of the prefix, and shows the corresponding relation with the DHCP Client identifier 321. The DHCP-PD section of the server 12 is mounted in HA1, however a DHCP-PD section may be mounted in a server separate from the HA1.

Figure 7:
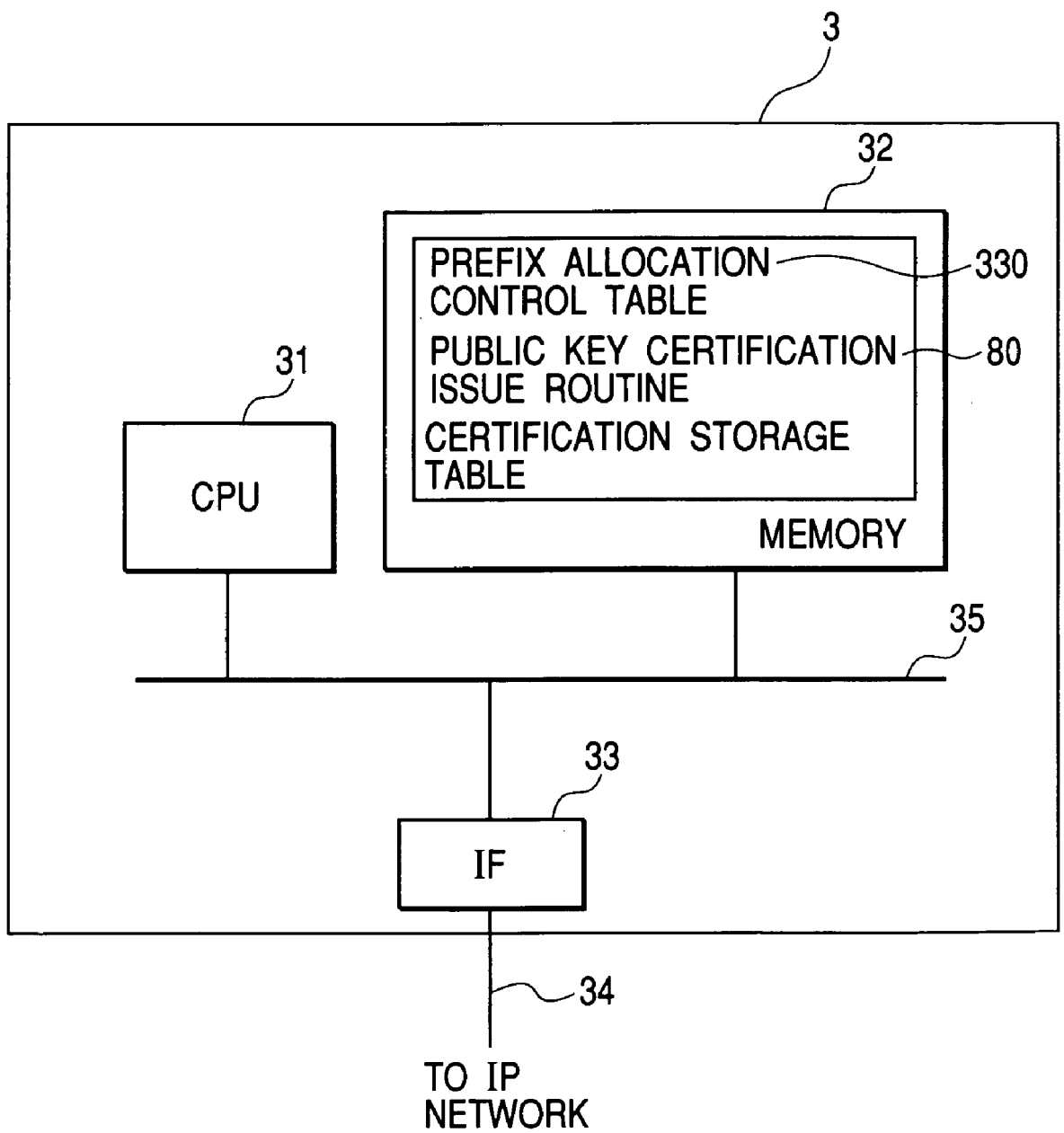
FIG. 7 is a block diagram of the certification authority CA3.

FIG. 7 shows the structure of the certification authority (CA) 3 installed in the IP network 7. The CA3 is comprised a CPU31, a memory 32, and an interface section (IF) 33 containing the line 34, and a bus 35 connecting these components.

The memory 32 is comprised of at least a prefix allocation control table 330 and, a public key certification issue routine 80, and a certifying information storage table.

FIG. 8 shows the table structure of the prefix allocation control table 330. The prefix allocation control table 330 stores a Prefix issue OK flag 332 showing whether or not permission to issue a prefix was issued to the identifier (ID) 331 of the terminal.

Figure 17:
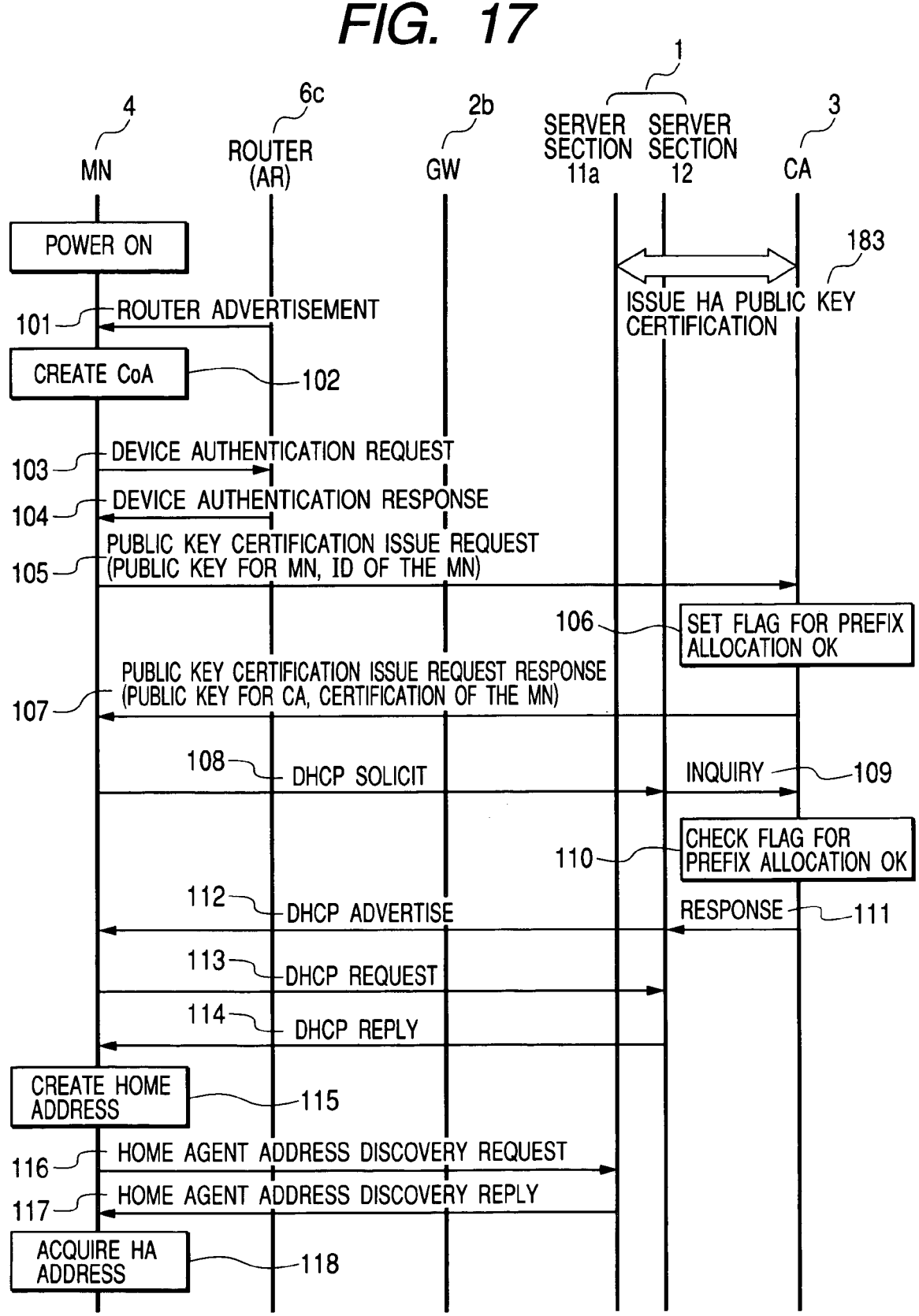
FIG. 17 is a sequence drawing 1 for location registration (binding update) and authentication in the present invention.
Figure 18:
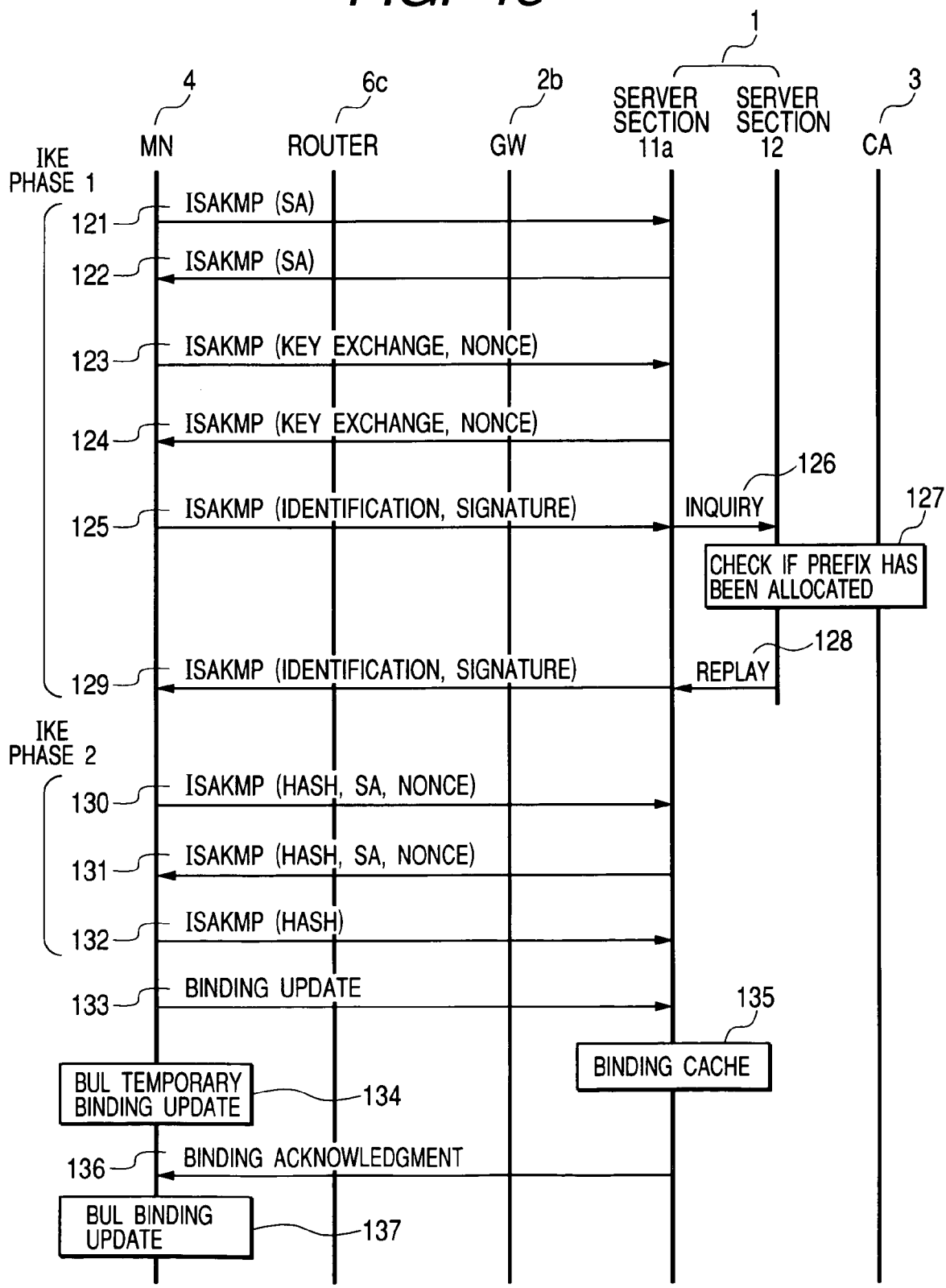
FIG. 18 is a sequence drawing 2 for location registration (binding update) and authentication in the present invention.

The sequence for location registration and authentication of MN4 in the network 5b shown in FIG. 1, is described according to the sequence shown in FIG. 17 and FIG. 18. In this embodiment, the MN4 contains a system to load the identifier and secret key and public key from a storage device typically a Secure Multimedia Card (SMMC), etc. The MN4 further contains a DHCP-PD requesting router function.

When power is turned on, the MN4 receives (101) a router advertisement from the router 6c belonging to the network 5b. The MN4 searches the M bit of the router advertisement and decides on a method for acquiring the CoA (Care of Address). If the M bit is 1, then MN acquires the CoA using the automated structure of the IPv6 statefull address. If the Mbit has not been set, then the Mbit creates a CoA (102) utilizing the automated structure of the IPv6 stateless address.

The MN4 next sends a device authentication request to the router 6c (103). The router 6c authenticates the device, using the device ID as a search (or retrieval) key. The router 6c sends (104) a device authentication response including the authentication results to MN4. A MAC address for example is utilized as the device ID.

When device authentication ends correctly, the MN4 loads the MN4 identifier and secret key and public key from a storage device such as the SMMC. The MN4 identifier specifies for example, a FQDN (fully qualified domain name) or a distinguished name of X.500.

The MN4 sends a public key certification issue request containing an MN4 public key and identifier to the CA3 (105). A CMP (Certificate Management Protocol) is utilized for sending and receiving the public key certification.

Figure 11:
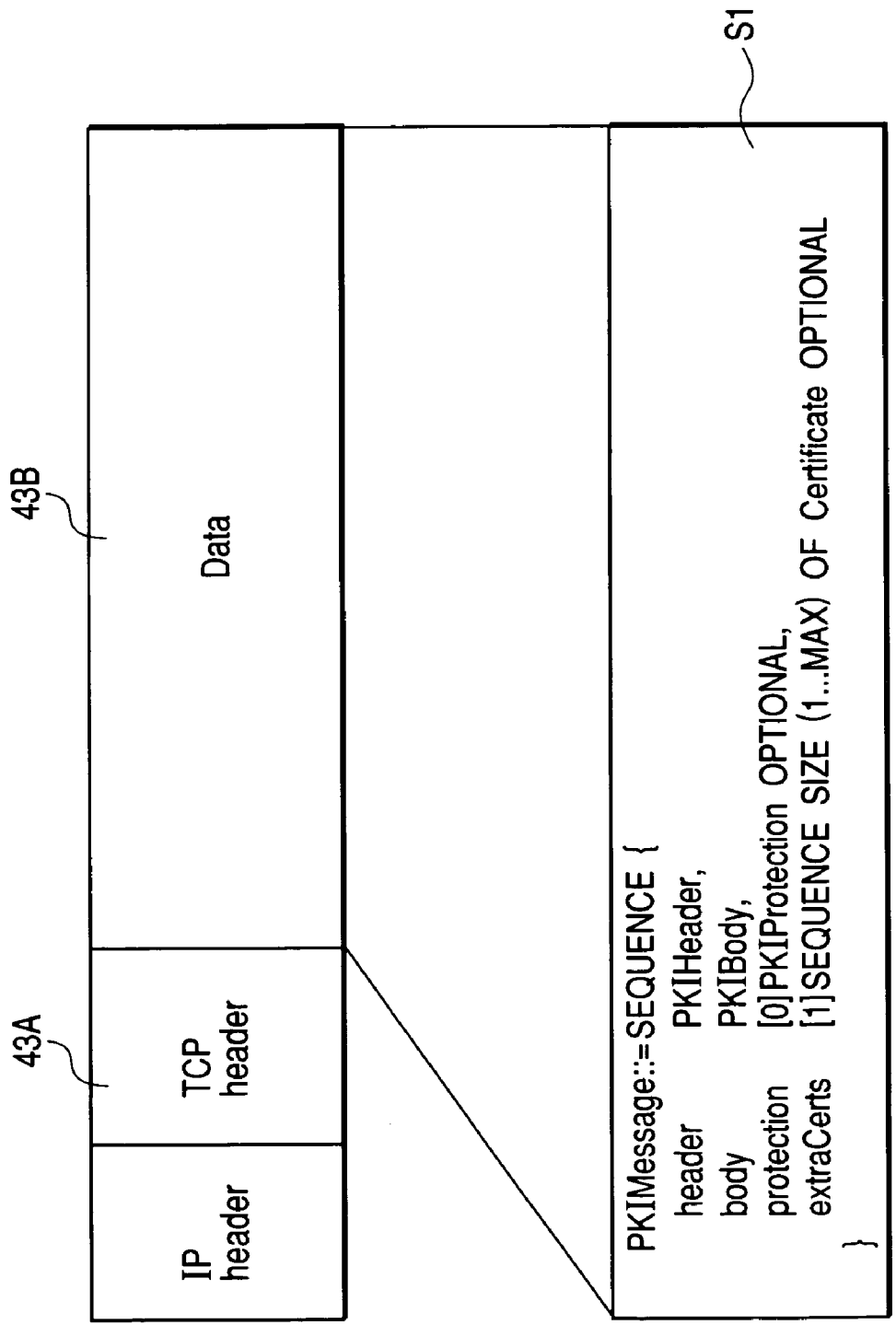
FIG. 11 is a drawing showing an example of a CMP message.

FIG. 11 shows a packet format S1 containing a CMP message.

Figure 10:
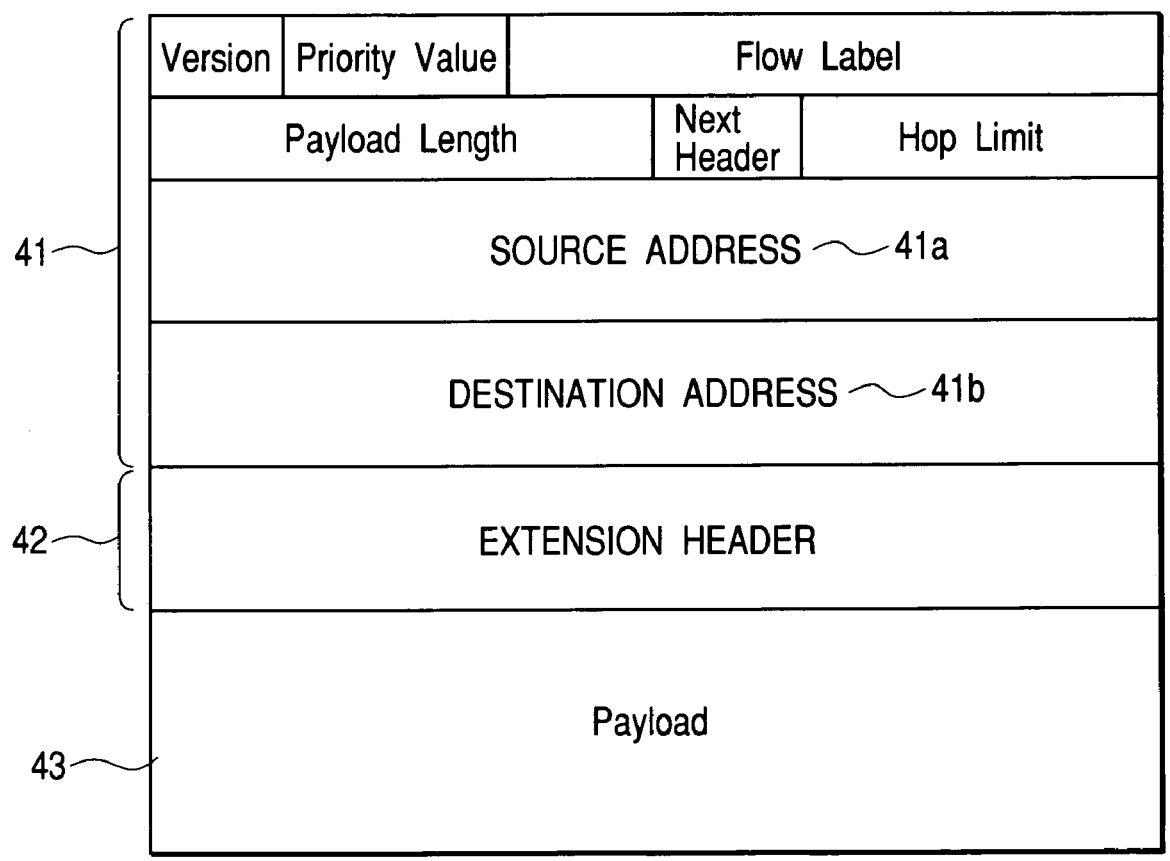
FIG. 10 is drawing showing the format of the IPv6 packet.

FIG. 10 shows the format of an IPv6 packet.

The CMP message S1 is stored in data section 43B within the payload 43 of the IPv6 packet.

The CA3 receives the request and starts the public key certification issue routine 80.

Figure 9:
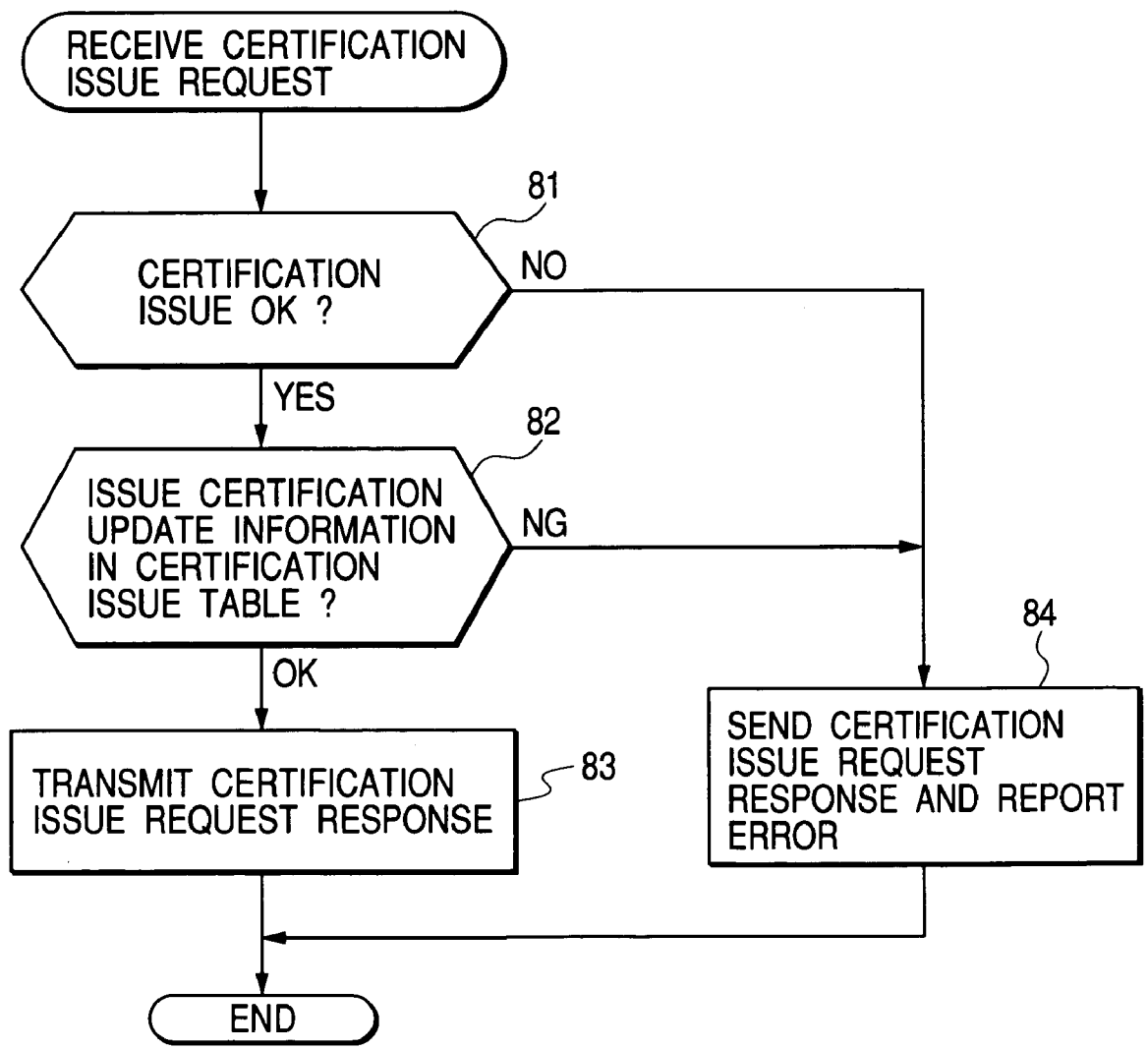
FIG. 9 is a flow chart of the public key certification issue routine contained in A3.

FIG. 9 shows the public key certification issue routine 80. The CA3 confirms whether a certification can be issued to MN4 using the MN4 identifier (81). If a certification can be issued then the CA3 issues a public key certification for MN4. The CA3 next creates a new entry for MN4 in the prefix allocation control table 330, and sets up a prefix issue OK flag (82, 106). The CA3 sends a public key issue request response containing a public key certification for MN4 and a public key for CN3, and ends this routine (83, 107).

When the certification cannot be issued in step 81, or in step 82 when the certification cannot be issued for a public key for MN4, the CA3 issues a certification issue request response (84) to notify the MN4 of the error and ends this routine.

The server section 11 of HA1 holds an identifier, a HA secret key and a HA public key. This procedure is similar to the procedure used by the MN which has its own MN secret and MN public key. The server section 11 acquires the public key certification from the CA3 (for server section 11) (183).

After acquiring the MN's public key certification, the MN4 starts the prefix request process and acquires a home prefix.

To find a DHCP server with a prefix that can be allocated, the MN4 sends a DHCP solicit message to the All_DHCP_Relay_Agents_and_Servers address (108). This solicit message includes a DHCP client identifier (client identifier option) and IA_PD option. An IAID showing a group (IA_PD) applying a prefix within the MN is set in the IA_PD options.

Figure 12:
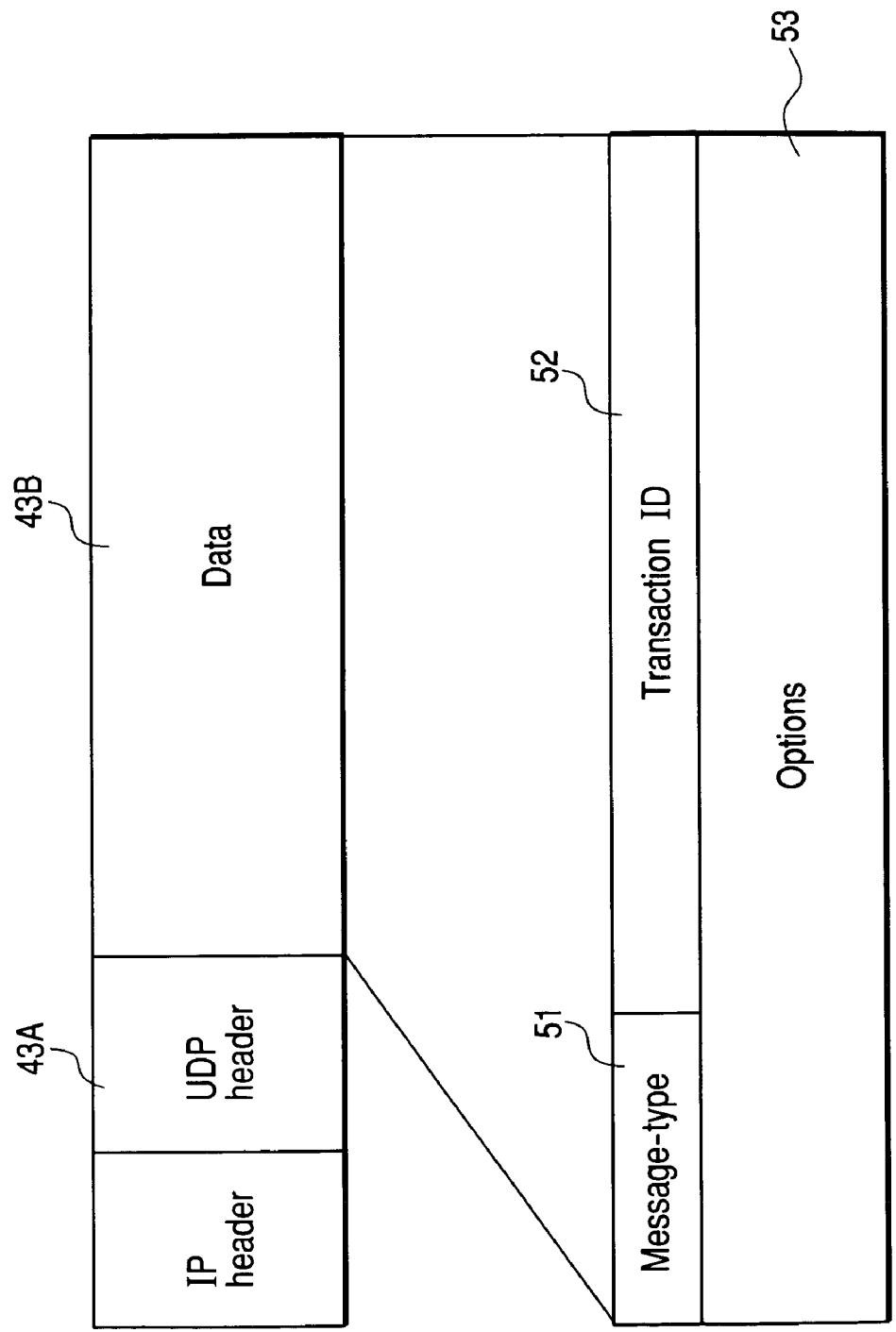
FIG. 12 is drawing showing the format of the DHCPv6 packet.

FIG. 12 shows an S2 packet format containing a DHCPv6 message. The DHCPv6 is an application protocol using UDP/IP in the transport layer. The DHCP message S2 is stored in the data section 43B of payload 43 of the IPv6 packet. The DHCP message specifies the value in the message-type field 51. The option parameter of the DHCP message is set in the Options field 53.

Here, the server section 12 for HA1 receives the DHCP solicit message (108). The server section 12 for HA1 then starts up the prefix delegation processing routine 60.

Figure 5:
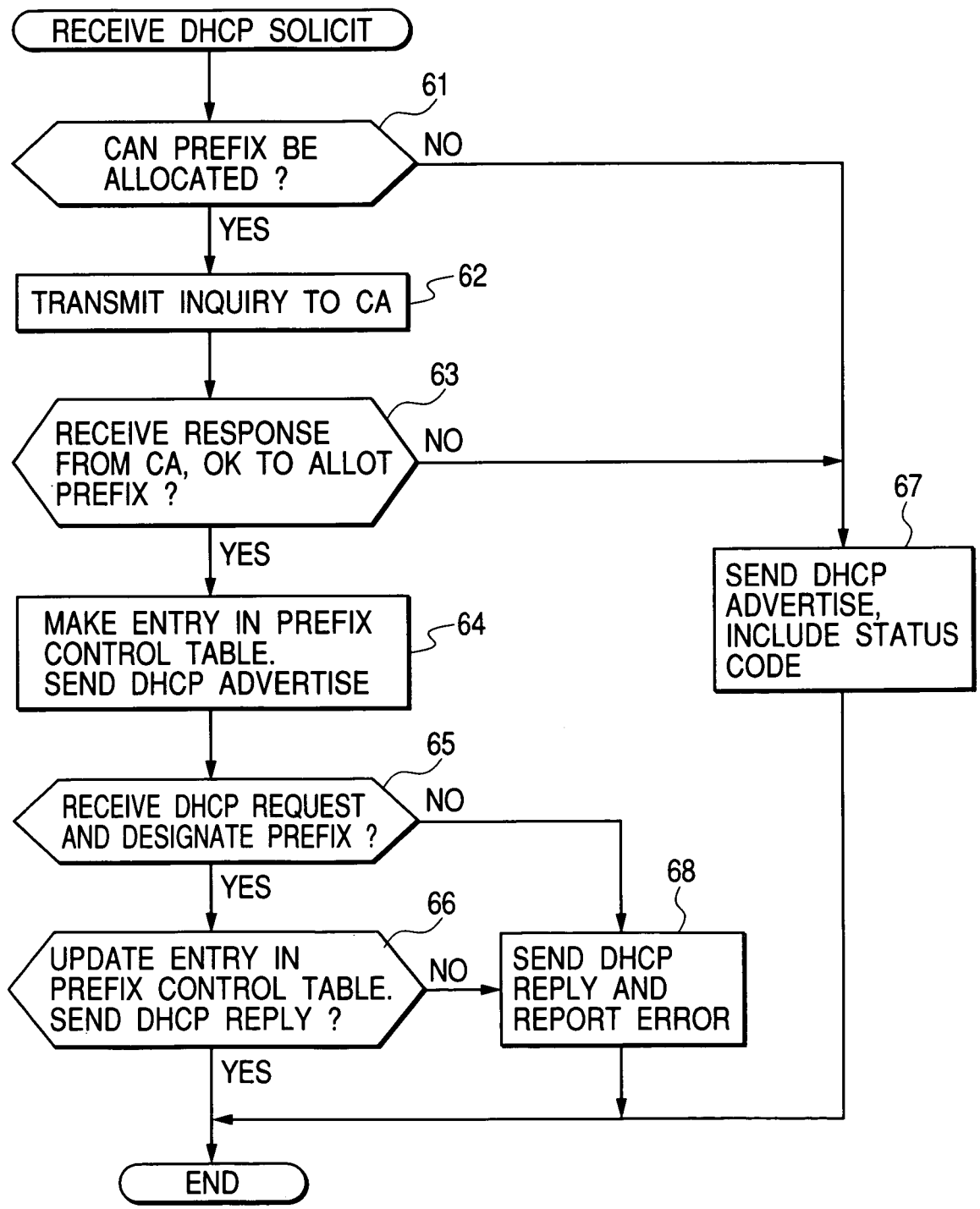
FIG. 5 is a flow chart of the prefix delegation processing routine contained in the DHCP-PD section of HA1.

FIG. 5 shows the prefix delegation processing routine 60.

The server section 12 loads the IAID from the IA_PD options of the DHCP solicit message, and decides (61) if a prefix can be allocated to the IAID. If a prefix can be allocated then the server section 12 designates an IA_PD from the IAID containing that DHCP solicit message. The server section 12 searches the table linking the MN4 identifier and IA_PD, using the IA_PD as a search (retrieval) key, and decides the MN4 identifier. The server section 12 sends a request (62, 109) containing MN4 identifiers to the CA3.

When an inquiry is received, the CA3 searches the prefix allocation control table 330 using the NN4 identifier as a search key (110).

The CA3 searches for the MN4 entry generated in step 106. The CA3 confirms that a prefix issue OK flag is set for the applicable entry, and sends a response showing prefix allocation is allowed, to the server 12 (63, 111).

When a response is received, the server section 12 searches the DHCP client identifier with the IAID contained in that DHCP solicit message, and the prefix control table 320. When the applicable entry is not present in the prefix control table 320, the server section 12 generates a new entry in the prefix control table 320, and stores an IAID 322 and DHCP client identifier 321 that are contained in that DHCP solicit message. The server section 12 then sends a DHCP advertise message to the MN4 (64, 112). This advertise message contains an identifier for server section 12 (server identifier option), an identifier for MN4 (client identifier option), and the IA_PD options received in step 108. The advertise message from the server section 12 may also include IPv6 prefix information for allocation.

When the server 12 cannot allocate the IPv6 prefix to the IAID in step 61, or when the CA3 does not allow allocation of the prefix in step 63, then the server 12 sends an advertise message containing a status code option to the MN4 showing the prefix cannot be allocated and ends this routine (67).

When allocation (or distribution) of the prefix is approved, the MN4 sends a DHCP request message containing IA_PD options to the server section 12 and requests IPv6 prefix information (113).

When the advertise message received in step 112 contains an IPv6 prefix message, the request message contains the prefix that the MN4 needs to use.

Here, returning to FIG. 5, the description of the prefix delegation processing routine 60 continues.

When the DHCP request message is received (65), the server section 12 loads the IAID and specifies the IPv6 prefix for allocation. When the request message contains IPv6 prefix information, then the prefix needed for use by MN4 is approved.

The server section 12 next searches the prefix control table 320 with the IAID and DHCP client identifier contained in the DHCP request message. The server section 12 detects and entry generated in step 64, and stores the IPv6 prefix for distribution and the prefix lifetime in the applicable entries. The server section 12 sends a DHCP reply message containing the prefix information to MN4 (66, 114), and ends this routine.

When a prefix for allocation to MN4 could not be specified in step 65, or when there was no applicable entry in the prefix control table 320 in step 66, then the server section 12 sends a DHCP reply message (68) to MN4 to report the error and ends this routine.

The MN4 extracts IPv6 prefix information from that DHCP reply message. The MN4 creates a home address from the prefix information and the MN4 interface identifier.

The MN4 next specifies the HA address using the HA (home agent) address discovery function. The MN4 sends the Home Agent Address Discovery Request (116) to the Mobile IPv6 Home-Agents Anycast Address set in the home network prefix received in step 114.

One of the HAs which process the same prefix as the Mobile IPv6 Home-Agents Anycast Address may receive the Home Agent Address Discovery Request.

The server section 11a of HA1 receives the Home Agent Address Discovery Request. The server section 11a sends the Home Agent Address Discovery Reply to the MN4 (117).

The MN4 receives the Home Agent Address Discovery Reply and acquires the HA address (address of server section 11a) (118).

The MN4 next utilizes an IKE to create an IPsec SA for use between the server section 11a and MN4.

In IKE phase1, an ISAKMP SA is established between the MN4 and server section 11a. The ISAKMP SA is a control channel for the IKE. The MN4 proposes ISAKMP SA parameters (121) utilizing the SA payload in the server section 11a.

Figure 13:
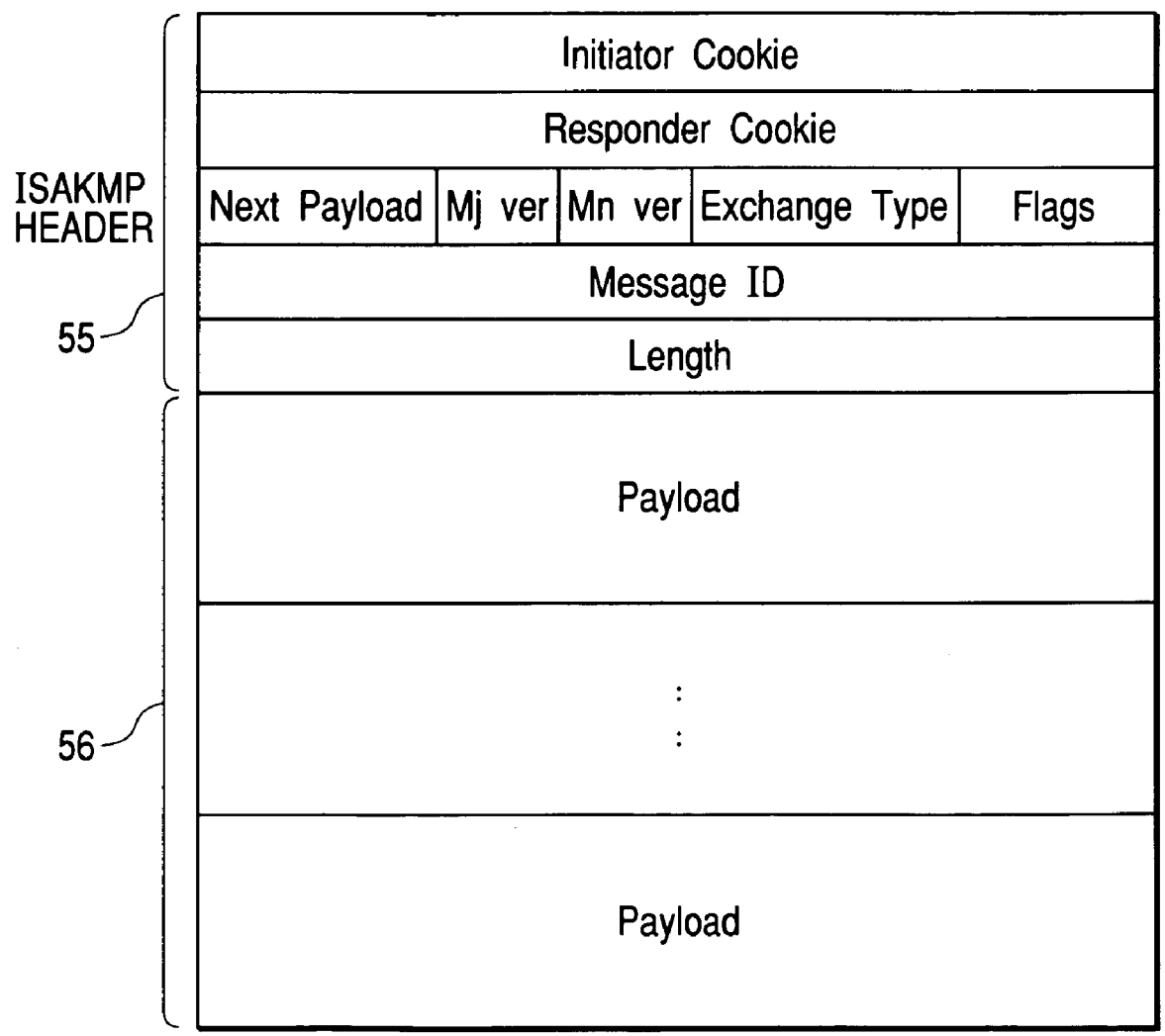
FIG. 13 is a drawing showing the format of an ISAKMP packet.

FIG. 13 shows the ISAKMP packet format S3. The packet format used by IKE is specified in the ISAKMP protocol. The IKE transport protocol is UDP/IP.

The ISAKMP packet S3 is stored in the data section 43B of payload 43 of the IPv6 packet. The ISAKMP packet S3 is comprised of an ISAKMP header 55 and one or more payloads 56. The payload 56 contains for example, an SA payload to transport the proposed SA, an identification payload to exchange the ID information, and a signature payload to send the digital signature, etc.

The server section 11a selects an acceptable proposal from the SA payload received in step 121 and returns it to the MN4 (122).

The MN4 and server section 11a next exchange Diffe-Hellman public values and random numbers obtained per Nonce (123, 124) and generate a secret key.

Figure 14:
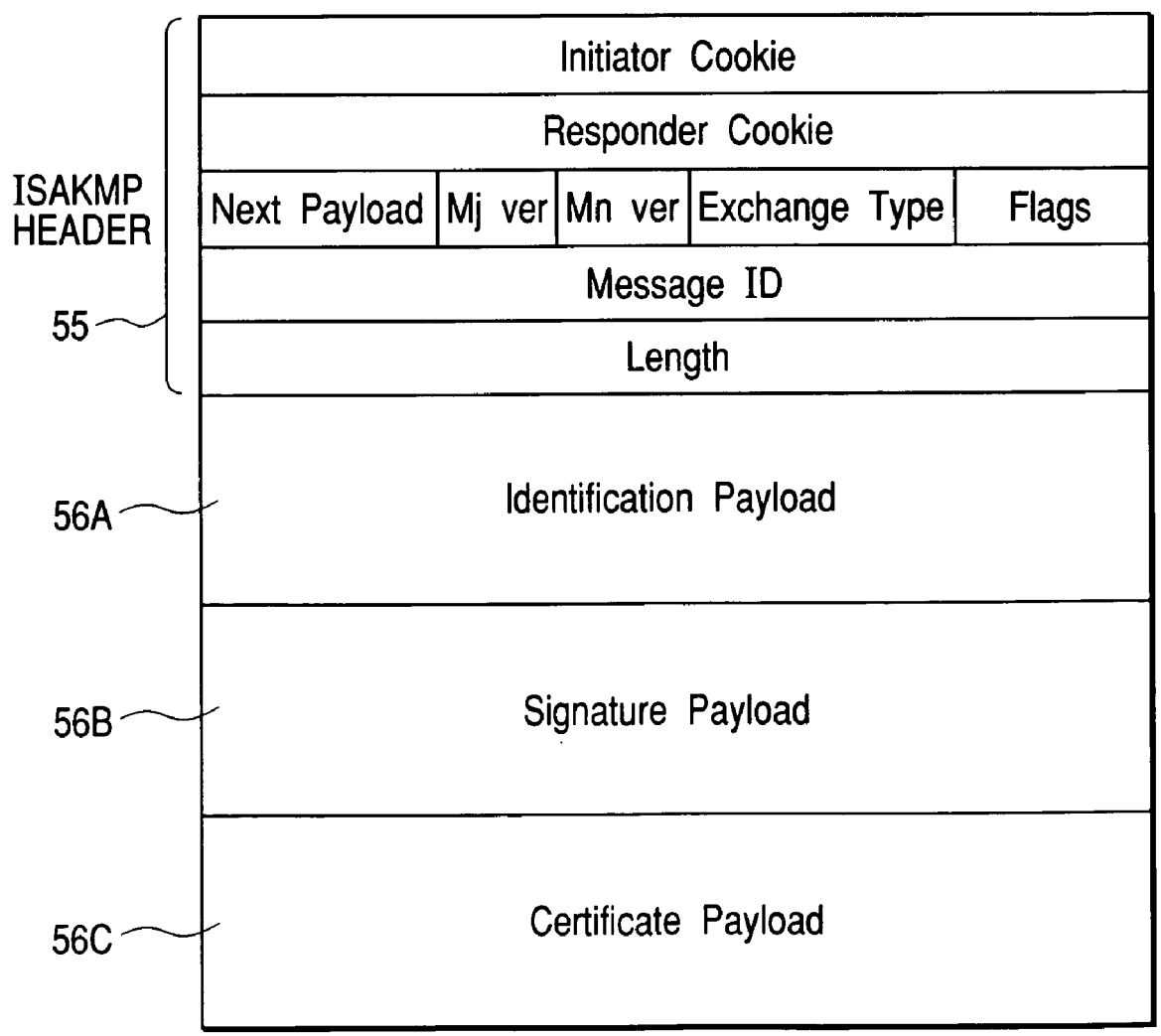
FIG. 14 is a drawing showing the format of an ISAKMP packet when confirming an identity of IKE phase 1.

The MN4 and server section 11a next exchange ID information for verifying a personal identity. In this embodiment, the signal sent when confirming if the identity attribute is the actual person is defined as the personal identity check signal. FIG. 14 shows the ISAKMP packet format S4 utilized in checking the personal identity for IKE phase 1. The ISAKMP packet S4 contains the identification payload 56A, signature payload 56B and the certificate payload 56C.

The MN4 sends (125) the ISAKMP packet utilized in the personal identity check to the server section 11a. The identification payload 56A of this ISAKMP packet 125 includes the home address generated by MN4 in step 115. The MN4 calculates the hash value, executes the digital signature utilizing the MN4 public key in that hash value, and sets it in the signature payload 56B. The certificate payload 56C includes MN4 public key certification that CA3 issued.

The server section 11a extracts the MN4 digital signature from the signature payload 56B of packet 125. The server section 11a then decodes the digital signature using the MN4 public key. The MN4 public key is acquired from the certificate payload 56C of packet 125.

The server section 11a confirms the personal identity of the packet sender MN4 by comparing the hash value calculated from the received packet 125 and the decoded value of that digital signature.

The server section 11a next extracts the MN4 home address from the identification payload of packet 125. The server section 11a sends an inquiry containing the home prefix to the server section 12 (126). The server section 12 searches the prefix control table 320 using the prefix contained in that request 126 as a search key. If an applicable entry is present in the prefix control table 320, then assigning of the prefix is complete (127). The server section 12 sends a reply to the server section 11a notifying that prefix allocation is complete (128).

If allocating of the prefix is complete, the server section 11a continues the processing of IKE phase 1. The server section 11a executes the digital signature using the public key of server section 11a in the hash value. The server section 11a sends the ISAKMP packet containing the digital signature to MN4 (129). The IP address of server section 11a is set in the identification payload of the ISAKMP packet 129. This ISAKMP packet may be included in the public key certification of server section 11a. The public key certification of server section 11a was issued in step 183. Alternatively the public key certification of server section 11a may be issued in step 181 and 182 of FIG. 29, and in this case the step 183 is needless (FIG. 28).

The MN4 receives the packet 129 and confirms if the other party in the IKE communication using the public key of server section 11a is genuine. The MN4 acquires the server section 11a public key from the public key certification in packet 129 or acquires it from CA3.

The ISAKMP SA has now been established between MN4 and the server section 11a.

The IPsec SA is next created in IKE phase 2, for MN4 and server section 11a. This IPsec SA is utilized when IPsec processing and forwarding the packets between the MN4 and server section 11a. The payload for ISAKMP packets sent and received in IKE phase 2 is encoded using the ISAKMP SA established in IKE phase 1.

The MN4 sends an ISAKMP packet to the server section 11a. An SA payload containing the IPsec SA proposal, a Nonce payload, and a hash payload were set in this ISAKMP packet (130). The server section 11a then sends to the MN4, the ISAKMP packet in which are set the IPsec SA payload containing the accepted IPsec proposal, the Nonce payload, and the hash payload (131).

The MN4 sends the ISAKMP packet containing the hash payload to the server section 11a (132). The server section 11a receives this packet (132) and confirms that MN4 has received the packet 131. The above process generates two IPsec SA (the IPsec to the server section 11a from MN4, and the IPsec SA to the MN4 from the server section 11a). The server section 11a and the MN4 store the IPsec SA (SPI, MN4 home address, and server section 11a address, etc.) in the respective SAD.

The MN4 sends a binding update adapted for the SA generated in IKE phase 2 to the server section 11a (133). The MN4 temporarily stores the address of server section 11a in the binding update list control table (134).

Figure 15:
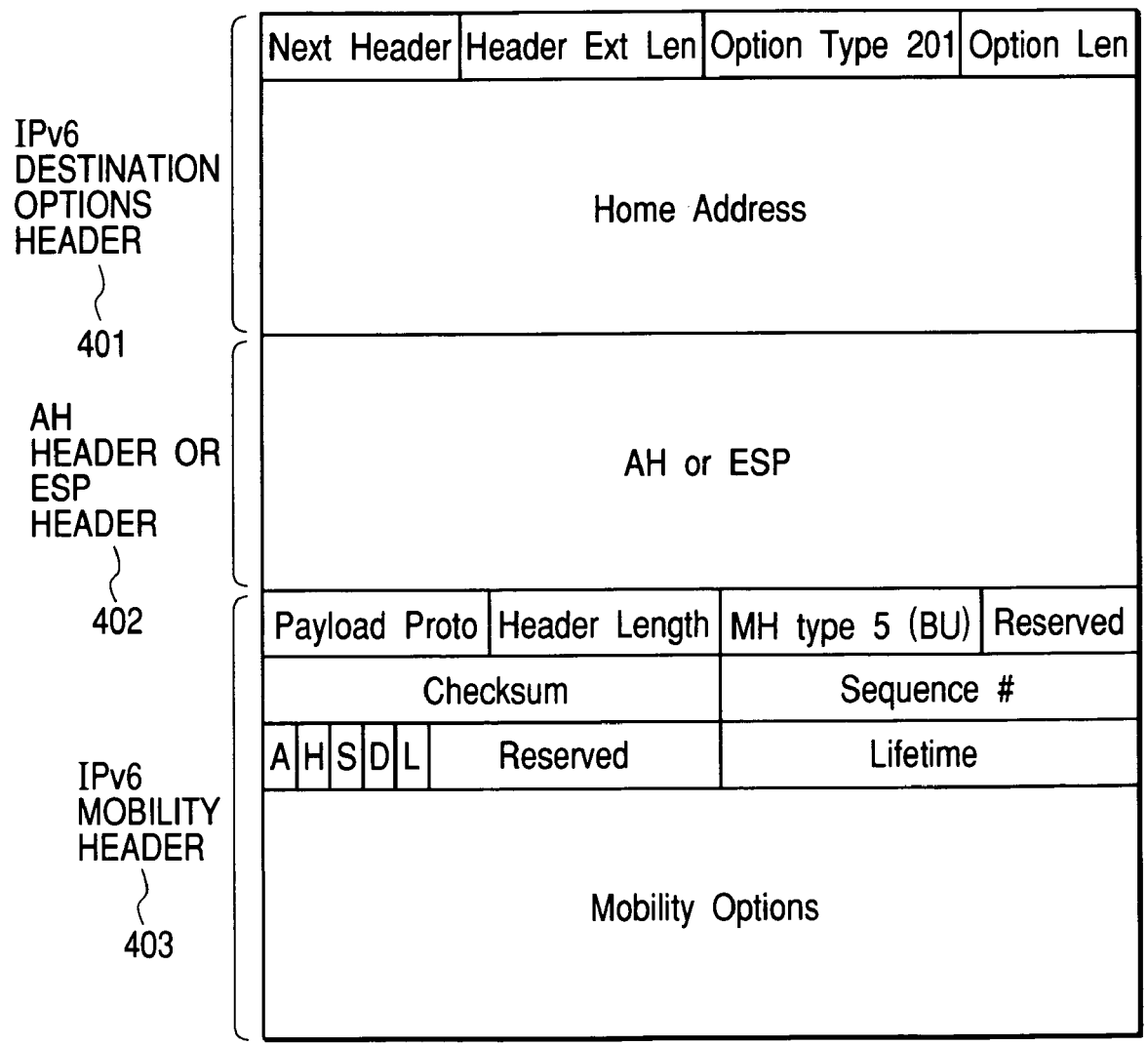
FIG. 15 is an example of a binding update message.

FIG. 15 shows the binding update message format S11 compatible with IPsec. The IPv6 destination options header 401, IPsec header (AH header or ESP header) 402, and the IPv6 mobility header 403 are stored in the IPv6 packet extension header 42.

The MN4 stores the following values in the binding update sent to the server section 11a. The CoA of the MN4 is set in the source address 41a of the IPv6 packet header. The home address that the MN4 generated in step 115 is set in the home address field of the IPv6 Destination Options Header 401.

The server section 11a receives this binding update 133 and starts the IPsec processing routine.

Figure 6:
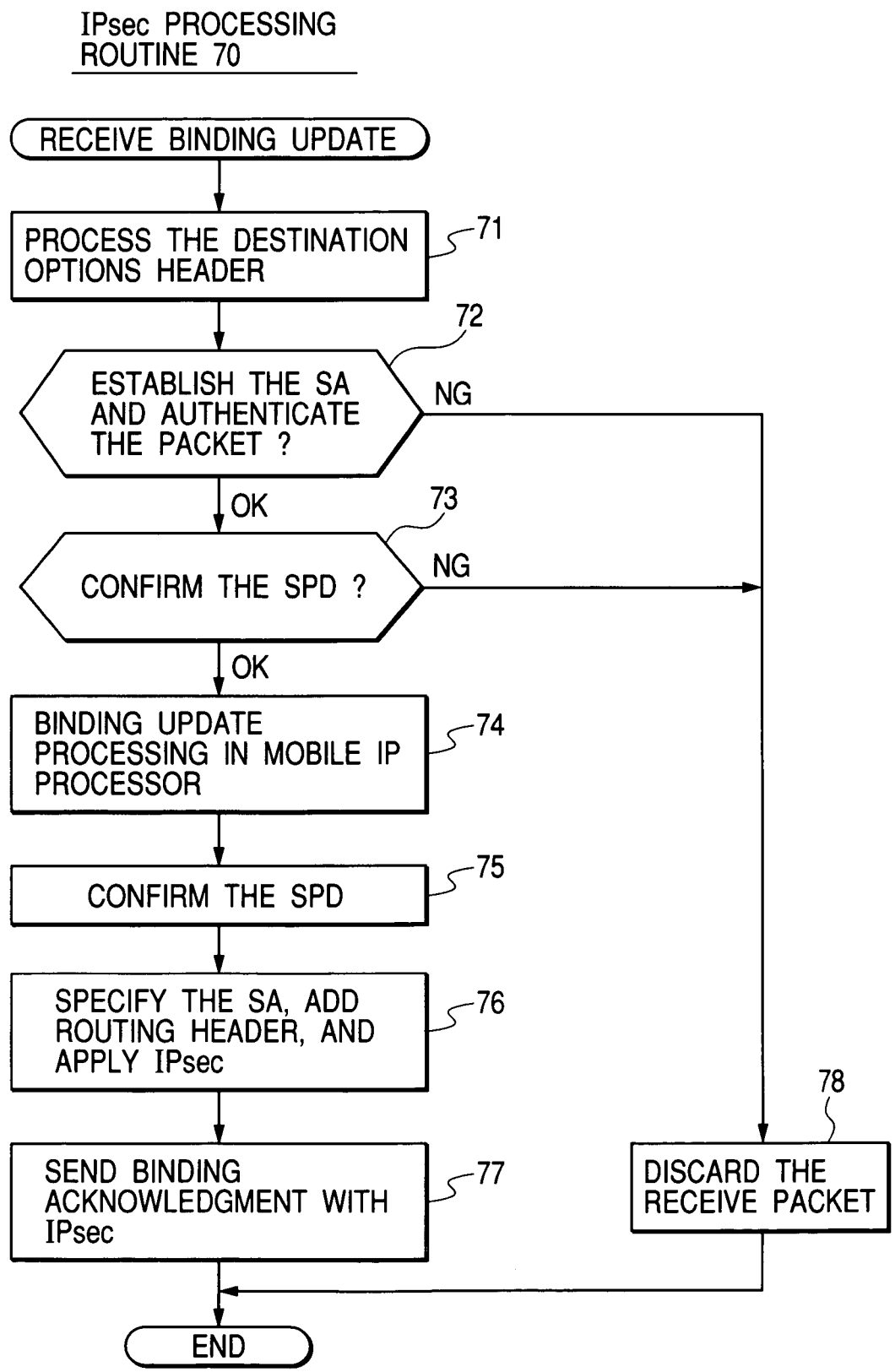
FIG. 6 is a flow chart of the IPsec processing routine contained in the IPsec of HA1.

FIG. 6 shows the IPsec processing routine 70. The IPv6 Destination Options Header 401 is processed first (71). More specifically, the Destination Options Header value (home address) and the source address value (CoA) are exchanged with each other.

The server section 11a next searches the SAD for the type of IPsec (AH or ESP), SPI value, and destination address, and specifies the IPsec SA. When the received packet has been encoded, the server section 11a first decodes the received packet and checks that it matches the specified IPsec SA (72). The server section 11a next searches the SPD, and checks whether the (now) reconstructed packet can be accepted (73).

If the packet can be accepted, then the IPsec processor 14 of server section 11a sends the reconstructed packet to the mobile IP processor 15.

The mobile IP processor 15 registers the MN4 location (makes a binding update) (74).

The mobile IP processor 15 searches the binding cache management table 310 using the MN4 home address as a search (retrieval) key. If there is no MN4 entry in that binding cache management table 310, then an MN4 entry is added to the binding cache management table 310 (135). The MN4 sets the CoA acquired in the visited network 5b, into the Care of Address 312 entry.

If the processing in step 72 and step 73 did not end correctly, then the server section 11a discards the received packet and ends this routine (78).

The mobile IP processor 15 sends the packet to the IPsec processor 14 for sending a binding acknowledgement adapted to IPsec, to the MN4. The IPsec processor 14 searches the SPD and investigates the packet security policy (75). When found that the packet is usable with IPsec, a matching SA is detected from the SAD. The IPsec processor 14 adds a routing header 404 to this packet and applies IPsec (76). The server section 11a next interchanges the routing header value and the destination address value. The server section 11 sends a binding acknowledgement subjected to IPsec processing, to MN4 (77, 136) and then ends this routine.

Figure 16:
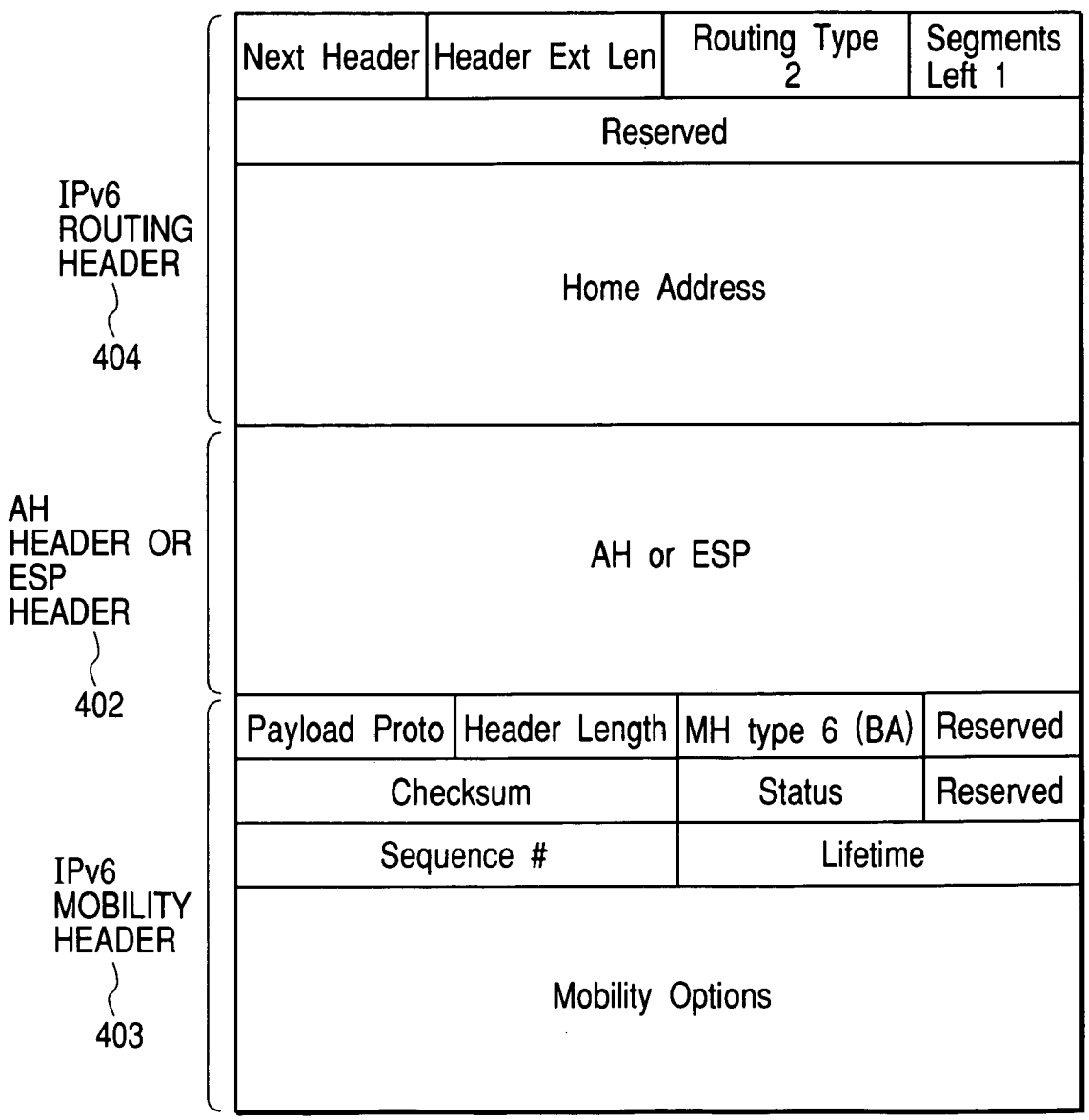
FIG. 16 is an example of a binding acknowledgement message.

FIG. 16 shows the format S12 of a binding acknowledgement message subjected to IPsec. The IPv6 routing header 404, the IPsec header (AH Header or ESP header) 402, and the IPv6 mobility header 403 are stored in the IPv6 packet extension header 42. The server section 11a stores the following values in the binding acknowledgment sent to the MN4. The CoA of MN4 is stored in the destination address 41b of the IPv6 packet header. The MN4 home address is stored in the home address field of the IPv6 routing header 404.

When the binding acknowledgement is received, the MN4 searches the SAD and specifies an SA. When the received packet has been encoded, the received packet is checked after decoding, to find if it matches the SA. The SPD is also searched and a check made to determine if the reconstructed packet can be accepted. If acceptable, the MN4 registers the entry temporarily stored in step 134, into the binding update list control table (137).

Here, the MN4 may register the identification information (for example FQDN) and information matching the home address acquired in step 115, into the home network 8, the visited network 5, or the location information control device (for example a DNS server device) belonging to the IP network 7.

The information appliance terminal 9 is comprised of a Mobile IPv6 function and a DHCP-PD requesting router function. An authentication method can be used with the information appliance terminal 9 if a public key certification is acquired from the CA3.

The first embodiment of the present invention can therefore provide an authentication method for verifying the authenticity of the IPv6 terminal, by linking a digital signature authentication method with a Mobile IP location registration (binding update) procedure, and by the HA creating and holding an SA for the home address linked to the public key certification.

The MN4 and HA1 server section 11 hold a public key certification issued by the CA3. The HA1 server section 12 and the MN4 contain a DHCP-PD section. By linking the CA3 and the HA1 server section 12, the HA1 can give a prefix notification to the MN4 to whom prefix allocation was approved by CA3. The HA1 server section 11 can further provide an authentication method for verifying the MN is genuine by generating an IPsec SA among the MN4 home prefix for the prefix that has been allocated by the server section 12 already.

Second Embodiment

The second embodiment of the present invention is described next while referring to the accompanying drawings.

Figure 19:
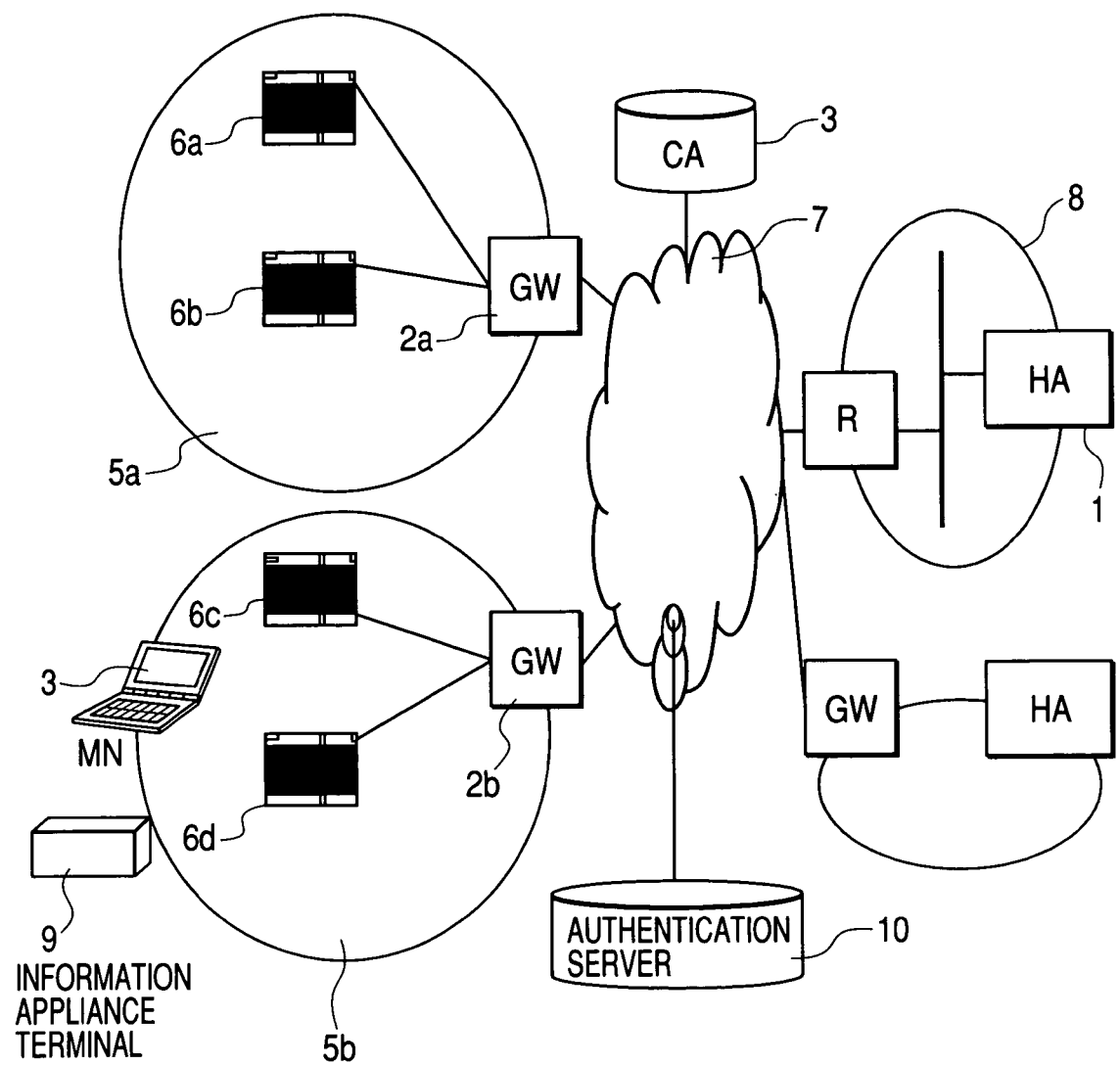
FIG. 19 is a concept drawing showing the structure of the communication network of the second embodiment.

FIG. 19 shows the structure of the communication network of the second embodiment of the present invention. The second embodiment is characterized in that the communication device 2 contains a DHCP-PD requesting router function. In the example of the second embodiment, the IP network 7 contains an authentication server 10. The authentication server 10 controls information (ID, passwords, etc,) required for authorizing access to the home network.

Figure 20:
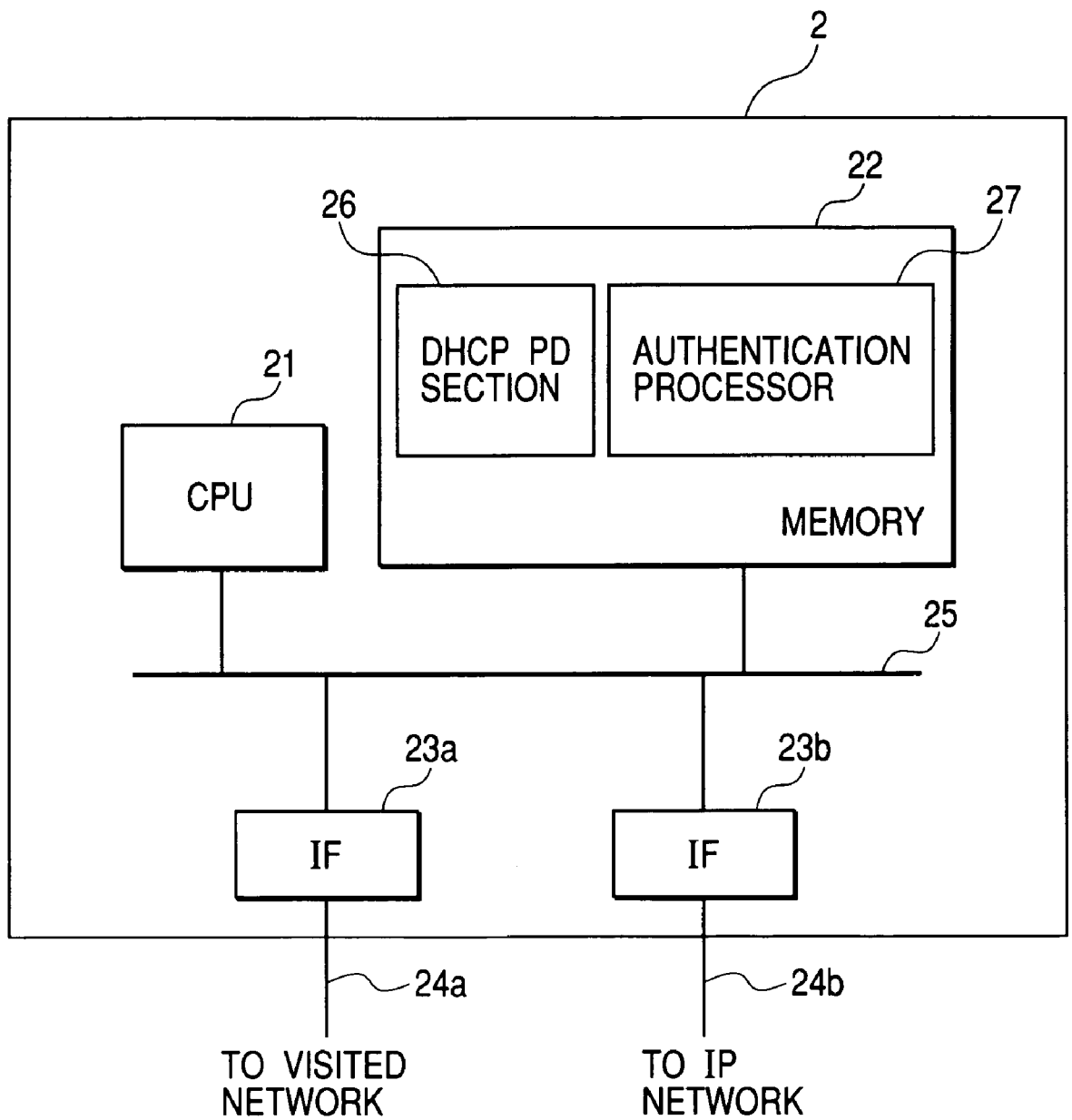
FIG. 20 is a block diagram of the communication device 2 of the second embodiment.

FIG. 20 shows the structure of the communication device 2 of the second embodiment of the present invention. The communication device 2 is comprised of a CPU 21, a memory 22, and an interface section (IF) 23 (23a, 23b) containing a line 24 (24a, 24b), and a bus 25 connecting these components.

The memory 22 is comprised mainly of a DHCP-PD section 26 containing a DHCP-PD requesting router function, and an authentication processor 27 for authorizing access to the home network 8.

Figure 21:
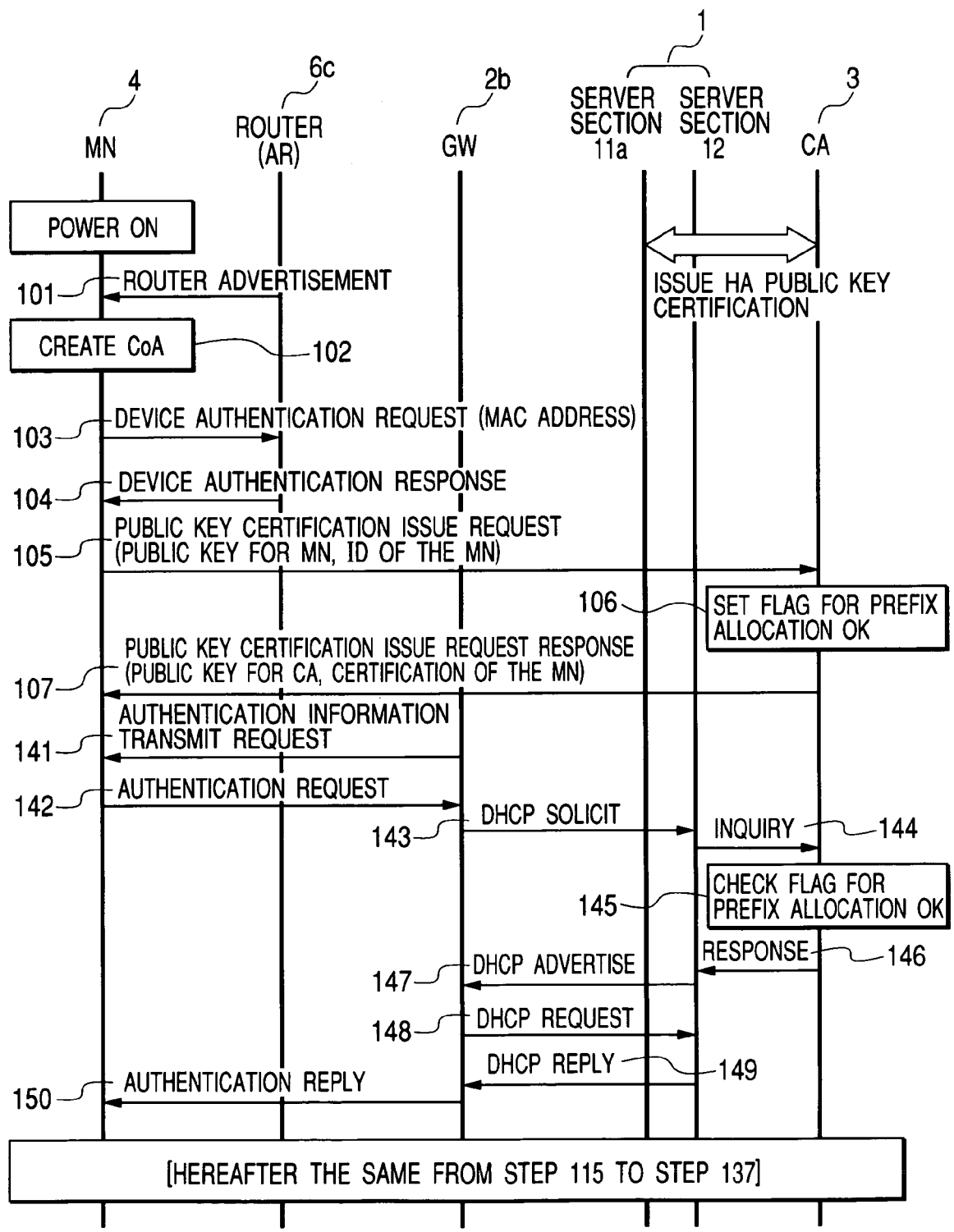
FIG. 21 is a sequence drawing for location registration (binding update) and authentication in the second embodiment.

FIG. 21 shows the sequence for location registration (binding update) and authentication of MN4 in the second embodiment of the present invention.

The first embodiment and the second embodiment differ in the installation locations for the DHCP-PD requesting router function. The communication device 2 (GW2) of the second embodiment contains a DHCP-PD requesting router function, and sends and receives DHCP-PD messages.

The process from step 101 to step 107 is the same as the first embodiment.

Hereafter, the process from step 141 onwards is described.

When a packet is received from the MN4, the GW2 requests that the MN4 send authentication information (141). The MN4 sends an authentication request containing an ID and password (142). The GW2b sends a DHCP solicit containing an IAID (143).

The server section 12 receives that DHCP solicit and specifies an IA_PD from the IAID. The server section 12 searches the table of corresponding MN4 identifiers and IA_PD using the IA_PD as a search (retrieval) key, and decides on an MN4 identifier.

The process from step 144 to step 146 is the same as steps 109 to step 111 in the first embodiment.

When the reply 146 is received, the server section 12 sends a DHCP Advertise (notification) to the GW2b (147). Hereafter, the processing from step 148 to step 149 for the server section 12 is the same as in the first embodiment.

When the DHCP reply 149 containing the prefix information is received, the GW2b sends an authentication reply containing prefix information to the MN4 (150). Hereafter, the MN authentication processing and the location registration (binding update) processing is the same as from step 115 to step 137 in the first embodiment.

The second embodiment of the present invention can therefore provide an authentication method for verifying the authenticity of IPv6 terminals not containing a DHCP-PD section, by linking a digital signature authentication method with a mobile IP location registration (binding update) procedure, even in cases where the communication device 2 is equipped with a DHCP-PD requesting router function.

The second embodiment can also provide a highly safe communication service by providing a function for authorizing access to HA from the communication device 2.

Third Embodiment

The third embodiment of the present invention is described next while referring to the accompanying drawings.

Figure 22:
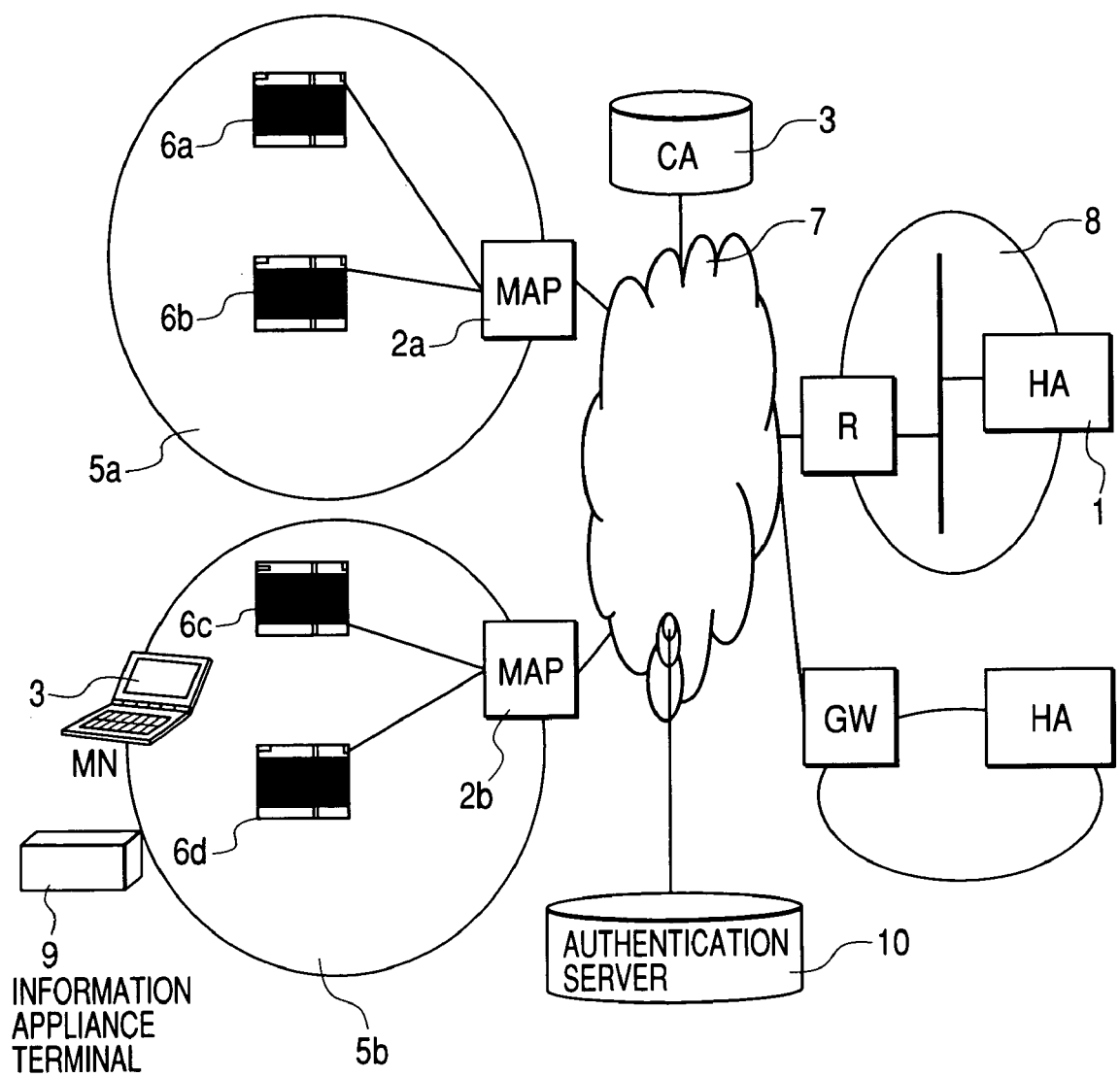
FIG. 22 is a concept diagram showing the structure of the communication network of the third embodiment.

FIG. 22 shows the structure of the communication network of the third embodiment of the present invention. In addition to the functions of the second embodiment, the third embodiment is characterized by possessing HMIPv6 MAP functions. In the third embodiment, the MN4 is a mobile terminal compatible with HMIPv6.

Figure 23:
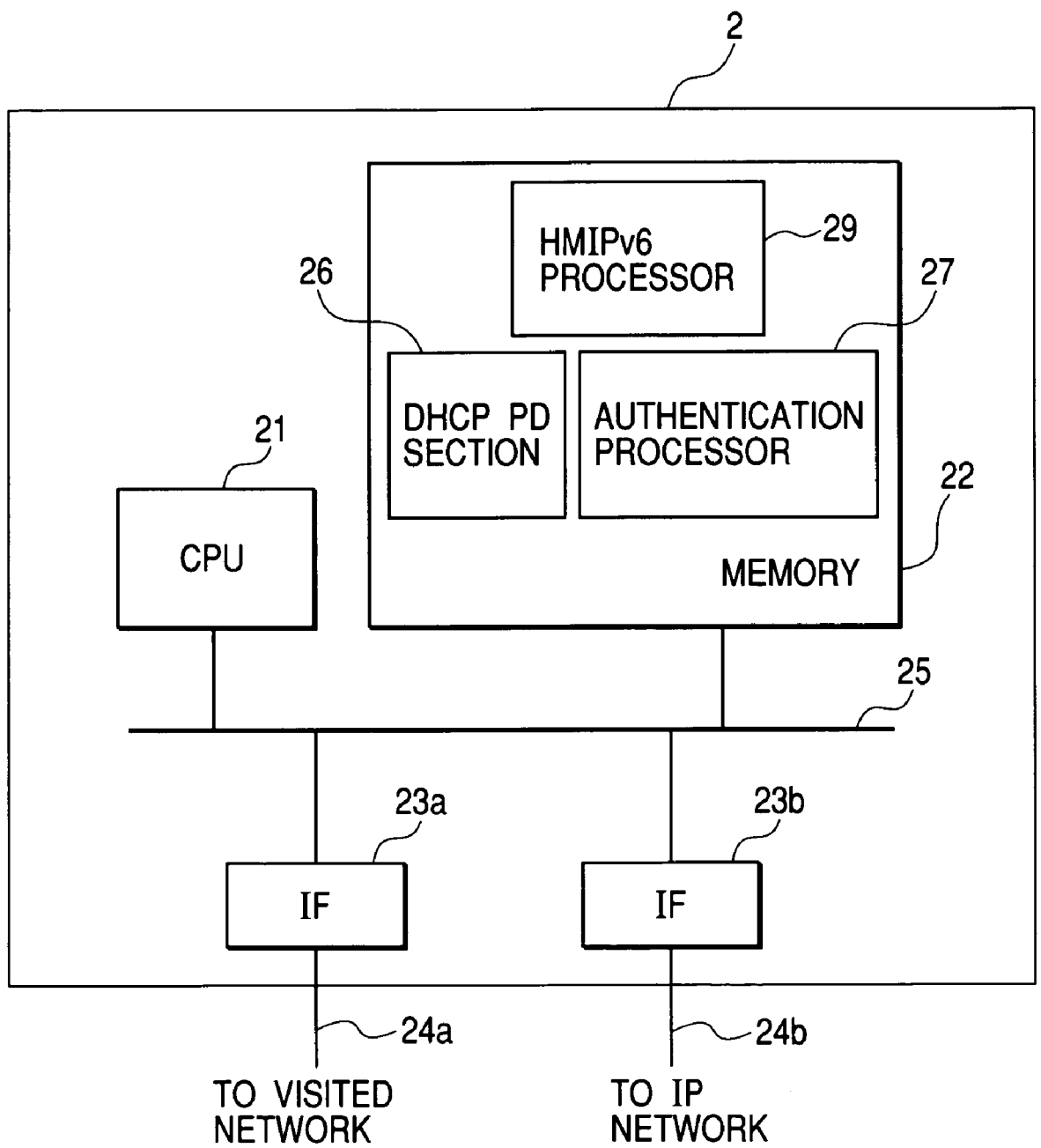
FIG. 23 is a block diagram of the communication device 2 of the third embodiment.

FIG. 23 shows the structure of the communication device 2 of the third embodiment. The memory 22 of the communication device 2 contains an HMIPv6 processor 29 in addition to the functions shown in the second embodiment. The HMIPv6 processor 29 provides the HMIPv6 compatible MAP functions. The HMIPv6 processor 29 contains a binding cache management table for holding information linking the RCoA and LCoA.

Figure 24:
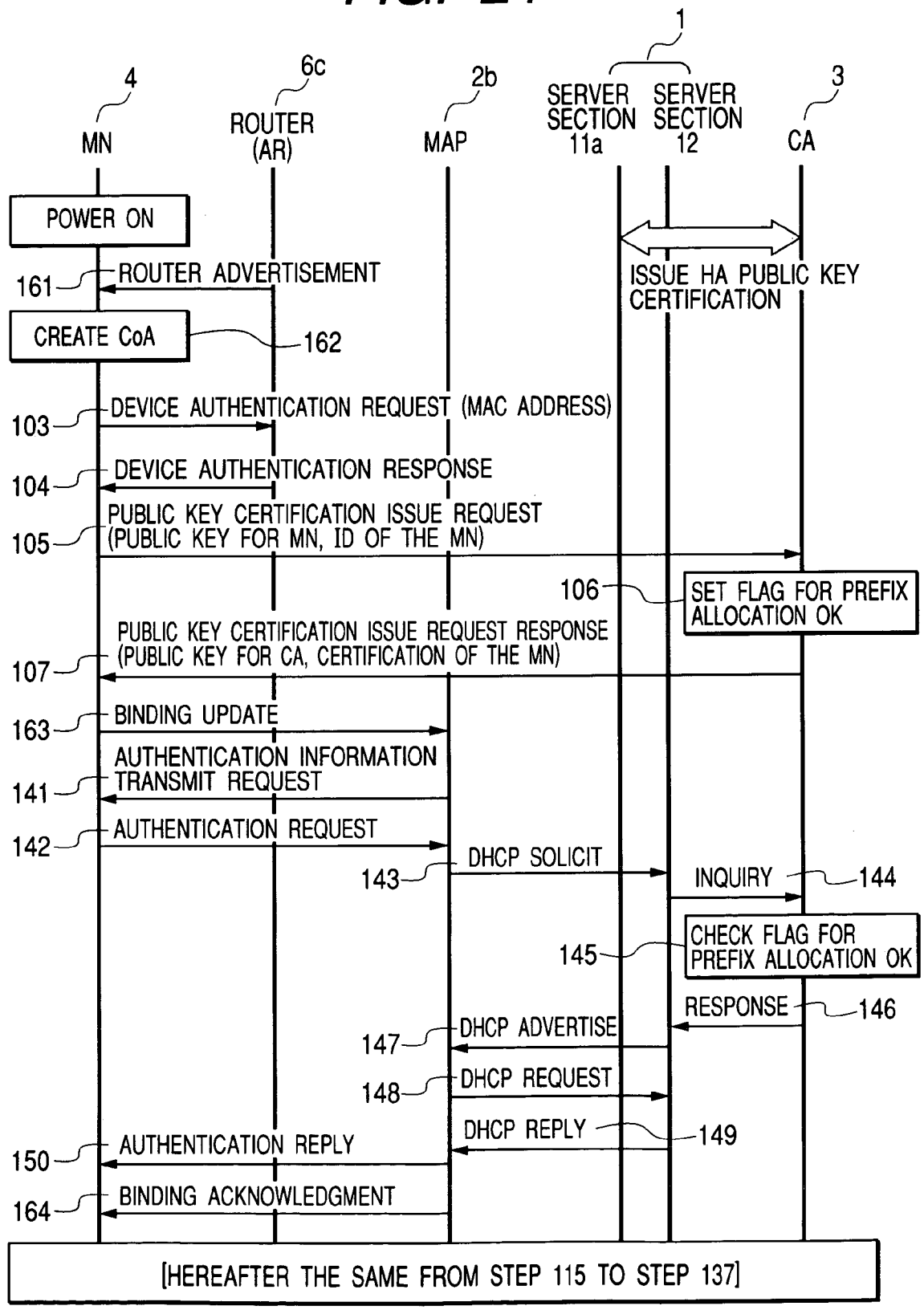
FIG. 24 is a sequence drawing for location registration (binding update) and authentication in the third embodiment.

The sequence for location registration (binding update) and authorization for MN4 in the network 5 shown in FIG. 22 are described according to the sequence shown in FIG. 24.

The MN4 receives a router notification (router advertisement) containing MAP options from the router (AR: Access Router) 6c belonging to the network 5b (161). The MN4 specifies the communication device (hereafter MAP) using the router advertisement information 161 and generates an RCoA and LCoA (162).

The process from step 103 to step 107 is the same as in the first embodiment.

When the MN4 receives the public key certification from the CA3, it sends a binding update (location registration signal) to the MAP2b (163).

In the third embodiment, the MAP2b utilizes the receiving of the binding update (location registration signal) to initiate authentication processing. The process hereafter from step 141 to step 150 is the same as the second embodiment.

When the processing up to step 150 ends correctly, the MAP2b stores information linking the RCoA and LCoA of MN4, into the binding cache management table of the HMIPv6 processor 29. The MAP2b sends the binding acknowledgement to the MN4 (164).

The MN authorization process and location registration (binding update) process hereafter are the same as from step 115 to step 137 of the first embodiment. The third embodiment of the present invention can therefore provide an authentication method for verifying the authenticity of IPv6 terminals not containing a DHCP-PD section, by linking a digital signature authentication method with a mobile IP location registration (binding update) procedure, even in cases where the communication device 2 is equipped with a HMIPv6 function.

The third embodiment can also provide a communication service with higher safety by the communication device initiating the access authentication processing for the home network when the HMIPv6 control signal is received.

Fourth Embodiment

The fourth embodiment of the present invention is described next while referring to the accompanying drawings. The structure of the communication network in the fourth embodiment is the same as in the first embodiment.

The fourth embodiment is characterized in that the server section 11 of the HA1 comprises a system to allocate the prefix to MN approved by the CA3, and in containing a MN4 public key certification control table. Information on the identification payload contained in the ISAKMP packet of IPsec phase 1 and information linked to the public key certifications are stored in the public key certification control table.

In the fourth embodiment, the HA1 and the MN need not contain a DHCP-PD section. The HA of the MN4 is the server section 11a.

Figure 25:
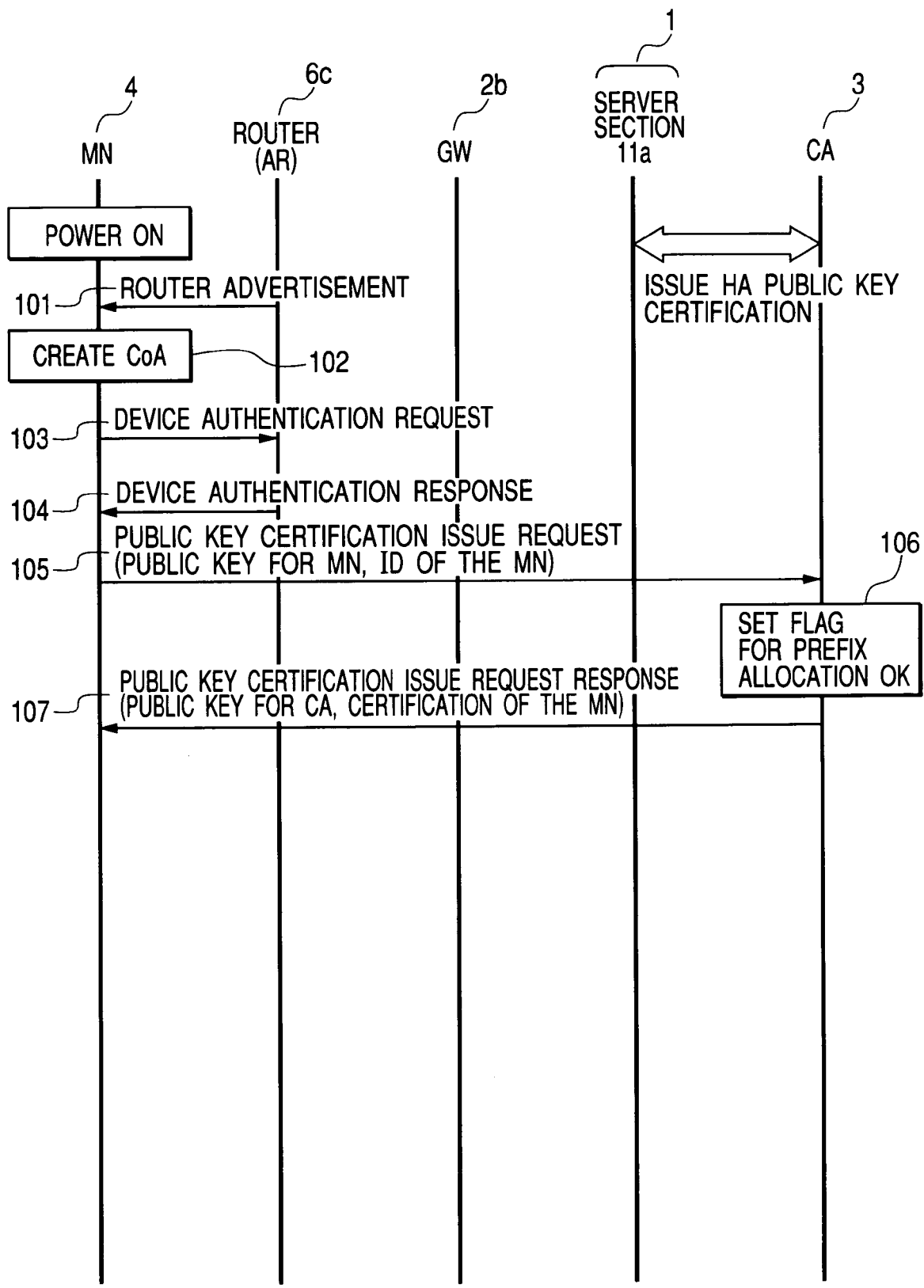
FIG. 25 is a sequence drawing 1 for location registration (binding update) and authentication in the fourth embodiment.
Figure 26:
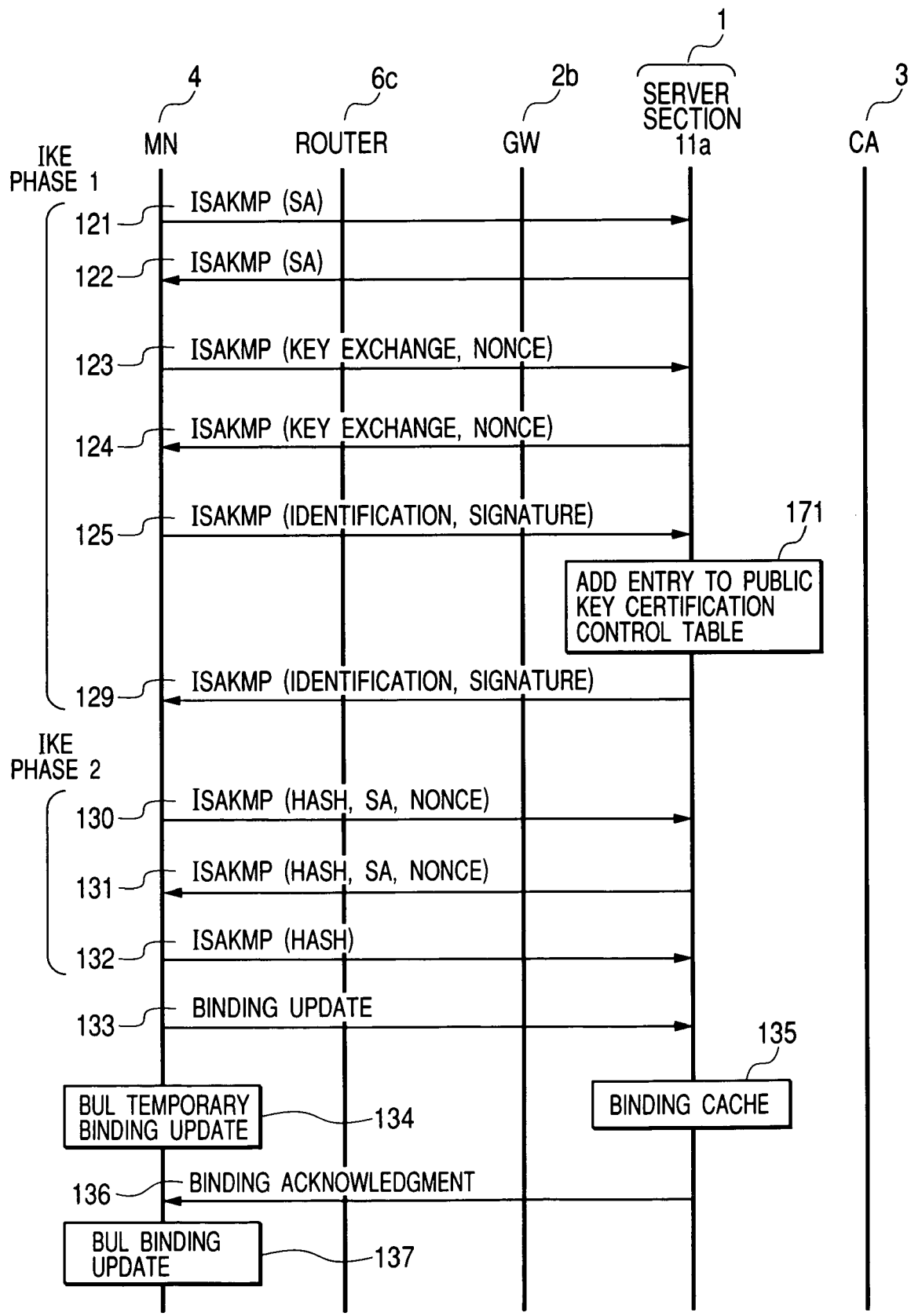
FIG. 26 is a sequence drawing 2 for location registration (binding update) and authentication in the fourth embodiment.
Figure 27:
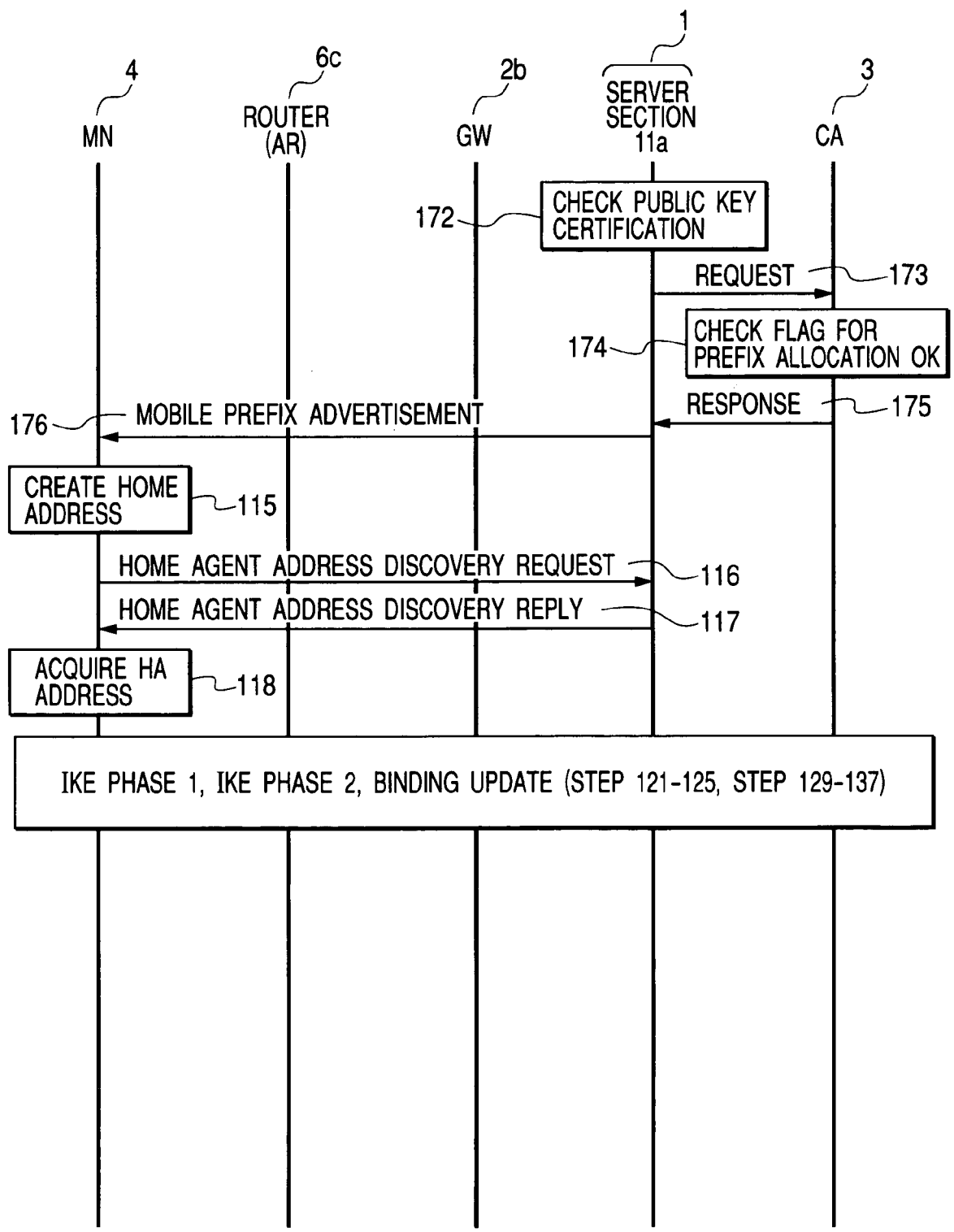
FIG. 27 is a sequence drawing 3 for location registration (binding update) and authentication in the fourth embodiment.

After the MN4 in the network 5b shown in FIG. 1, has completed location registration (binding update) in the server section 11a, the sequence from the HA1 server section 11a notifying the MN4 of the prefix, to the MN4 once again completing location registration (binding update) is described while following the sequence shown from FIG. 25 through FIG. 27.

The sequence from step 101 to step 107 is the same as in the first embodiment.

The MN4 next creates an IPsec SA in the server section 11a.

The sequence from step 121 through step 125 is the same as in the first embodiment. The MN4 sends to the server section 11a, an ISAKMP packet 125 containing an identification payload set with the M4 home address, and with a certificate payload set with the MN4 public key certification.

The server section 11a loads the certificate payload and identification payload information from the packet 125, and adds the MN4 entry to the public key certification control table (171). If an MN4 entry is already present, then the applicable entry is rewritten (updated).

The sequence from step 129 to step 132 is the same as in the first embodiment.

The MN4 carries out location registration (binding update) utilizing an IPsec SA generated by MN4 and the server section 11a. The location registration (binding update) is the same as the first embodiment (from step 133 to 137).

When the server section 11a is for example changing its own prefix, the MN4 current performing the binding update is notified of the prefix by the server section 11a.

The server section 11a first searches the binding cache management table 310 and then detects the MN4 entry generated in step 135. The server section 11a next searches the public key certification control table using the MN4 home address as a search (retrieval) key and loads the MN4 public key certification made in step 171.

The server section 11a specifies the MN4 identifier from the public key certification, and sends an inquiry along with this MN4 identifier to the CA3 (172, 173).

When this inquiry is received, the CA3 searches the prefix allocation control table 330 using the MN4 identifier as a search (retrieval) key.

The CA3 detects the MN4 entry created in step 106. The CA3 confirms that an applicable entry is set in the prefix issue OK flag (174). The CA3 sends a reply to the server section 11a showing a prefix can be allocated (175).

When the reply is received, the server section 11a sends a mobile prefix advertisement to report the prefix information to the MN4 (176). The server section 11a applies the IPsec SA generated in steps 130 to 132, in the mobile prefix advertisement message.

The MN4 loads the prefix from the mobile prefix advertisement. The MN4 detects changes in the home prefix, and generates a home address. The process from creating the home address to completion of location registration (binding update) is the same as step 115 through 125 in the first embodiment (step 129 through step 137).

The fourth embodiment of the present invention is therefore capable of notifying the MN4 of the prefix information, by linking HA1 and CA3 after confirming the MN is genuine.

As clearly shown by the above embodiments, the present invention provides an authentication method for verifying that the IPv6 terminal is genuine by linking a digital signature authentication method with a Mobile IP location registration (binding update) procedure.

In particular, an authentication method can be provided for verifying the terminal x is genuine when performing Mobile IP binding updates (location registration) with a terminal x an HA belonging to zone A as a home network in zone B, with the method comprising a system for a DHCP-PD delegating router function belonging to zone A to distribute a prefix to the terminal X belonging to zone B; and further comprising: 1) a system for inquiring whether a DHCP-PD delegating router function can allocate a prefix to CA, 2) a system for inquiring whether the HA contains prefix information in the DHCP-PD delegating router function, 3) a system for acquiring a terminal x public key from CA or terminal x when the HA is creating IPsec SA with the terminal x, 4) a system for the HA to approve only location registration (binding update) subjected to the IPsec generated above in 3).

The above described authentication method for verifying a terminal x not comprising a DHCP-PD section, can be provided if a communication device mutually connected to both zone A and zone B contains a DHCP-PD requesting router function and a function authorizing zone A access. Further, a communication service with a high degree of safety can be provided since the communication device allows only authenticated terminals x to have access to the HA.

Also, if the communication device mutually connected to both zone A and zone B contains a MAP function for HMIPv6, then the communication device can use the HMIPv6 control signal as a trigger to initiate access authorization processing for zone A.

Further, if the HA1 contains a system for communicating with CA3 and a system for holding MN4 public key certification, then prefix information can be reported to the MN4, after the HA1 verifies the MN4 is authentic and reports this to CA3.

What is claimed is:

1. A server system for implementation within a communication system that includes a terminal control device, the server system comprising:
    a processor that issues and guarantees a public key certification for a terminal device;
    a memory that holds prefix allocation allow/prohibit information of the terminal device, the prefix allocation allow/prohibit information indicating whether allocation of a prefix to the terminal device is allowed or prohibited; and
    a communications interface that receives a public key issue certification request from said terminal device, rewrites said prefix allocation allow/prohibit information, and communicates with a terminal control device to manage the terminal device and to manage location information of the terminal device, wherein
    said processor is implemented to run a first routine in which the public key certification issue request is received from said terminal device, the public key certification of said terminal device is issued, said prefix allocation allow/prohibit information is rewritten, and said public key certification is sent to said terminal device,
    said processor is implemented to run a second routine in which an inquiry on whether prefix allocation is allowed or prohibited is received from said terminal control device, said prefix allocation allow/prohibit information is searched, and the prefix allocation allow/prohibit information acquired is sent to said terminal control device, and
    the terminal control device has a DHCP-PD function and allocates prefix information to the terminal device based on the prefix allocation allow/prohibit information using the DHCP-PD function.

2. A communication system according to claim 1, wherein said terminal creates a home address from said prefix information and a terminal interface identifier.

3. A terminal control device comprising:
    a connection for communication with a server device that issues and guarantees a public key certification for a terminal device and that holds prefix allocation allow/prohibit information which indicates whether allocation of a prefix for the terminal device is allowed or prohibited;
    a transceiver that acquires the public key certification from said server device; and
    a storage that holds location information for the terminal device, wherein
    the terminal control device implements a routine to maintain security by utilizing IPsec technology through which information confirming an identity of said terminal device is received from said terminal device, the public key certification for the terminal device is acquired from said server device, information allowing prefix allocation for said terminal device is loaded from said server device, and, if said server device approves allocation of the prefix to said terminal device, prefix information is allocated to said terminal device, and
    the terminal control device has a DHCP-PD function and allocates the prefix information to the terminal device based on the information allowing prefix allocation for said terminal device using the DHCP-PD function to enable the terminal device to create a home address for the terminal device based on the prefix information and an interface identifier for a communication interface with the server device.

4. A terminal control device according to claim 3, further comprising:
    an information processing device having a prefix allocation function,
    wherein information confirming the identity of said terminal is received from said terminal device,
    an inquiry for prefix information is made to said information processor device, and
    a reply to the inquiry that indicates that said prefix was allocated is made from said information processor device,
    then a reply to the information confirming said identity of the terminal is sent to said terminal device from the transceiver.

5. A terminal control device according to claim 3,
    wherein a location registration request or a binding update request is received from said terminal device, and security information of said terminal device is loaded, and if said request matches said security information, then location registration or binding update of said terminal device is performed in the terminal control device.

6. A terminal authentication method for a communication system containing an information processor device with a prefix allocation function, a server device that contains a processor and a memory and that guarantees and issues a public key certification for a terminal device, a visited network to which the terminal device is implemented to connect, a home network which is associated with the terminal device and which is mutually connected with said visited network, and a terminal control device connected to said home network via said visited network, the terminal authentication method comprising:
    said server device issuing a public key certification to said terminal device and rewriting prefix allocation information for said terminal device;
    said information processor device receiving a prefix allocation request from said terminal device, making an inquiry for prefix allocation allow/prohibit information indicating whether allocation of a prefix is allowed or prohibited to said server device, and notifies said terminal control device upon allocation of the prefix being approved;
    said terminal control device receiving information confirming the identity of the terminal device from said terminal device, allocating the prefix information to the terminal device based on the information allowing prefix allocation for said terminal device using a DHCP-PD function, and sending the prefix information allocated to said terminal device to said information processor device;

said information processor device establishes a security association between the terminal device to which said prefix information is issued and said terminal control device;

and the terminal device creating a home address from the prefix information and an interface identifier for a communication interface with the server device.

7. A terminal authentication method according to claim 6, wherein a communication device mutually connected to the home network and the visited network sends a prefix allocation request to said information processor device.

8. A terminal authentication method according to claim 7, wherein said terminal control device receives a location registration request from said terminal device, loads said security association, and approves location registration of said terminal device when said location registration request fulfills said security association.

9. A terminal authentication method according to claim 6, wherein said terminal control device comprises a communication interface for communicating with said server device, and a storage device for storing public key certification information for a terminal device; and said information processor device sends prefix information to a terminal device approved by said server device.

10. A combination method for authentication and location registration of a terminal located in a visited network, the method comprising:

powering on a terminal device;

sending a router advertisement to the terminal device from a visited network router;

creating a care of address (CoA) in the terminal device;

sending a device authentication request to the visited network router;

sending a public key certification issue request with a public key and a terminal ID to a calling authority server (CA) over an IP protocol network;

issuing a public key certification issue response from the calling authority server compatible with IPv6 protocol;

establishing an IPsec security association (SA), digital signature via IKE (internet key exchange), and a secure communication channel using phase I and II IPsec ISAKMP protocols between the terminal in the visited network and a home agent server which is linked to the calling authority server (CA) and which located in a home area;

making a location binding update in the terminal device using the IPsec security association (SA);

sending a request to check the public key certification to the calling authority server (CA) from the home agent server;

holding prefix allocation allow/prohibit information of the terminal device that indicates whether allocation of a prefix is allowed or prohibited;

receiving a response from the calling authority server that indicates whether prefix allocation is allowed with a prefix and creating a home address for the terminal device;

discovering and obtaining a home address of the home agent server by the terminal device;

making a location binding update by the terminal device using a binding cache from the home agent server; and thereby providing an authentication method for verifying a terminal authenticity by linking a digital signature method with a location binding update method, wherein the terminal control device has a DHCP-PD function and allocates prefix information to the terminal device based on the prefix allocation allow/prohibit information using the DHCP-PD function, and the terminal creates the home address from the prefix information and an interface identifier for a communication interface with the calling authority server.

\* \* \* \* \*